(12) United States Patent
Ozkan et al.

(10) Patent No.: US 10,964,942 B2
(45) Date of Patent: Mar. 30, 2021

(54) NICKEL NANOSTRUCTURE ELECTRODE AND METHOD

(71) Applicant: The Regents of the University of California, Oakland, CA (US)

(72) Inventors: Cengiz S Ozkan, San Diego, CA (US); Mihrimah Ozkan, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 104 days.

(21) Appl. No.: 16/316,221

(22) PCT Filed: Jul. 7, 2017

(86) PCT No.: PCT/US2017/041099
§ 371 (c)(1),
(2) Date: Jan. 8, 2019

(87) PCT Pub. No.: WO2018/009796
PCT Pub. Date: Jan. 11, 2018

(65) Prior Publication Data
US 2019/0245204 A1 Aug. 8, 2019

Related U.S. Application Data

(60) Provisional application No. 62/359,820, filed on Jul. 8, 2016.

(51) Int. Cl.
*H01M 4/52* (2010.01)
*H01M 4/66* (2006.01)
(Continued)

(52) U.S. Cl.
CPC .......... *H01M 4/523* (2013.01); *C01D 15/005* (2013.01); *C01G 53/04* (2013.01); *H01M 4/13* (2013.01);
(Continued)

(58) Field of Classification Search
CPC .......... H01M 10/052; H01M 10/0525; H01M 10/0568; H01M 2004/021;
(Continued)

(56) References Cited

FOREIGN PATENT DOCUMENTS

CN 105023768 A 11/2015
WO WO-2018009796 A1 1/2018

OTHER PUBLICATIONS

C. Liu, C. Li, K. Ahmed, Z. Mutlu, C. S. Ozkan, M. Ozkan. Template Free and Binderless NiO Nanowire Foam for Li-ion Battery Anodes with Long Cycle Life and Ultrahigh Rate Capability, Scientific Reports, 6:29183, DOI: 10.1038/srep29183, 2016.*

(Continued)

*Primary Examiner* — Carlos Barcena
(74) *Attorney, Agent, or Firm* — Schwegman Lundberg & Woessner, P.A.

(57) ABSTRACT

A nickel based micro-structured material and methods are shown. In one example, the nickel based micro-structured material is used as an electrode in a battery, such as a lithium ion battery. One specific example shown includes NiO-decorated Ni nanowires with diameters around 30-150 nm derived from Ni wire backbone (around 2 μm in diameter). In one specific example, The NiO nanowire foam can be manufactured with bio-friendly chemicals and low temperature processes without an templates, binders and conductive additives, which possesses the potential transferring from lab scale to industrial production.

9 Claims, 19 Drawing Sheets

(51) Int. Cl.
| | |
|---|---|
| *H01M 4/80* | (2006.01) |
| *H01M 4/38* | (2006.01) |
| *H01M 4/13* | (2010.01) |
| *H01M 10/0568* | (2010.01) |
| *H01M 10/052* | (2010.01) |
| *C01G 53/04* | (2006.01) |
| *H01M 4/525* | (2010.01) |
| *H01M 10/0525* | (2010.01) |
| *C01D 15/00* | (2006.01) |
| *H01M 4/02* | (2006.01) |

(52) U.S. Cl.
CPC ........... *H01M 4/382* (2013.01); *H01M 4/525* (2013.01); *H01M 4/661* (2013.01); *H01M 4/666* (2013.01); *H01M 4/808* (2013.01); *H01M 10/052* (2013.01); *H01M 10/0525* (2013.01); *H01M 10/0568* (2013.01); *C01P 2002/72* (2013.01); *C01P 2002/82* (2013.01); *C01P 2002/85* (2013.01); *C01P 2002/88* (2013.01); *C01P 2004/03* (2013.01); *C01P 2004/16* (2013.01); *C01P 2006/40* (2013.01); *H01M 2004/021* (2013.01); *H01M 2300/0025* (2013.01); *Y02T 10/70* (2013.01)

(58) Field of Classification Search
CPC .... H01M 2300/025; H01M 4/13; H01M 4/32; H01M 4/382; H01M 4/523; H01M 4/525; H01M 4/661; H01M 4/666; H01M 4/808; C04B 2235/3279

See application file for complete search history.

(56) References Cited

OTHER PUBLICATIONS

International Application Serial No. PCT/US2017/041099, International Search Report dated Sep. 29, 2017, 2 pgs.

International Application Serial No. PCT/US2017/041099, Written Opinion dated Sep. 29, 2017, 4pgs.

Bell, J, et al., "Freestanding Ni—NiO nanofiber cloth anode for high capacity and high rate Li-ion batteries", Nano Energy, [Online] retrieved from the internet: <URL:http://www.sciencedirect.com/science/article/pil/S2211285515003742>, 47-56.

Yang, et al., "NiO Nanorod Array Anchored Ni Foam as Binder-free Anode for High-rate Lithium Ion Batteries", Journal of Materials Chemistry vol. 2, [Online] Retrieved from the Internet :<https//www.researchgate.net/profile/Chaoqun_Dong5/publicatiOfl/266917932_NiO_nanorod_array_anchored_Ni_foam_as_a_binder-free_anode_for_high-rate_lithium_ion_batteries/liflkS/585d6f3608ae8fce48fe6085.pdf>, (Oct. 15, 2014), 20022-20029.

International Application Serial No. PCT/US2017/041099, International Preliminary Report Patentability dated Jan. 17, 2019, 6 pgs.

\* cited by examiner

NICKEL NANOSTRUCTURE ELECTRODE AND METHOD

CLAIM OF PRIORITY

This application is a U.S. National Stage Filing under 35 U.S.C. 371 from International Application No. PCT/US2017/041099, filed on Jul. 7, 2017, and published as WO 2018/009796 A1 on Jan. 11, 2018, which claims the benefit of priority to U.S. Provisional Patent Application No. 62/359,820, filed on Jul. 8, 2016, each of which is hereby incorporated by reference herein in its entirety.

GOVERNMENT SUPPORT

This invention was made with Government support under Grant No. DMR-0958796, awarded by the National Science Foundation. The Government has certain rights to the invention.

TECHNICAL FIELD

This invention relates to nickel based material microstructures and methods. In one example, this invention relates to nickel oxide electrodes for lithium ion batteries.

BACKGROUND

Improved batteries, such as lithium ion batteries are desired. One example of a battery structure that can be improved is an anode structure.

DETAILED DESCRIPTION

Figure 1:
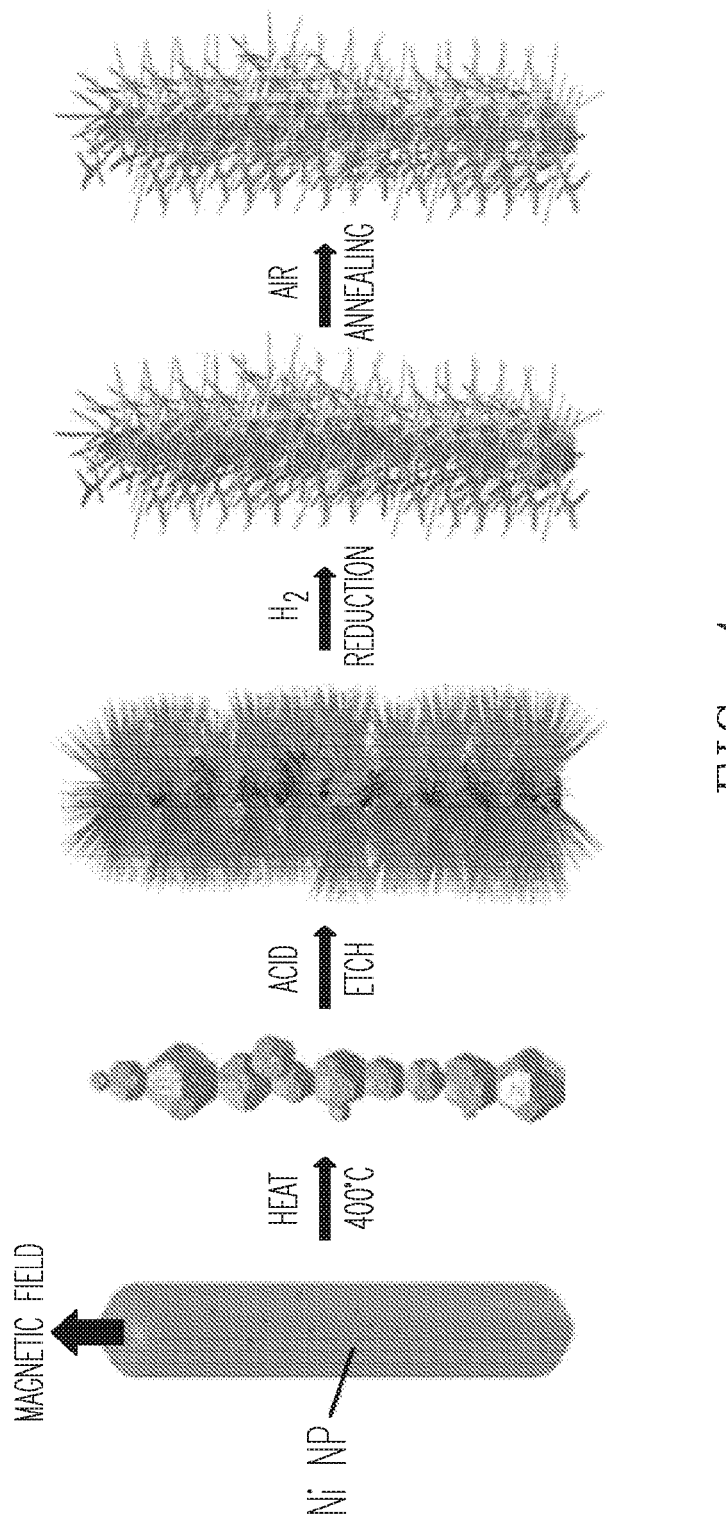
FIG. 1 shows a progression of formation steps of an electrode according to an example of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

Herein, NiO-decorated Ni nanowires with diameters around 30-150 nm derived from Ni wire backbone (around 2 μm in diameter) is directly synthesized on commercially available Ni foam as a renovated anode for Li-ion batteries. Excellent stability with capacity 680 mAh g$^{-1}$ at 0.5 C (1 C=718 mA g$^{-1}$) is achieved after 1000 cycles. Superior rate capability is exhibited by cycling at extremely high current rates, such as 20 C and 50 C with capacities about 164 and 75 mAh g$^{-1}$, respectively. The capacity can be recovered back to about 430 mAh g$^{-1}$ in 2 cycles when lowered to 0.2 C and stably cycled for 430 times with capacity 460 mAh g$^{-1}$. The NiO nanowire foam anode possesses low equivalent series resistance about 3.5Ω, resulting in superior power performance and low resistive losses. The NiO nanowire foam can be manufactured with bio-friendly chemicals and low temperature processes without any templates, binders and conductive additives, which possesses the potential transferring from lab scale to industrial production.

In recent times, electric vehicles (EVs) are vigorously investigated and developed to diminish the dependence on fossil fuels and alleviate the deterioration of natural environment. Hybrid (HEV) and plug-in (PEV) hybrid EVs utilizing both batteries and internal combustion engines (ICEs) can partially resolve these issues, but the consumption of gasoline and emission of greenhouse gases from ICEs still remain problematic. Pure EVs powered by purely lithium ion batteries (LIBs) can totally eliminate these difficulties. However, the cruise range of pure EVs is still limited, such as about 300 miles per charge of Tesla Model S. Accordingly, it is crucial to improve the capacity and energy density of LIBs while maintaining the power density simultaneously. Capacity of a graphite anode with potential about 0.2 V vs. Li is limited to theoretically 372 mAh g$^{-1}$ and practically about 310 mAh g$^{-1}$ for LiC$_6$ as a result of intercalation reactions. Higher energy density and capacity can be reached by utilizing conversion reactions of metal oxides, such as FeO, CoO, NiO and CuO, in potential range 0.01-3 V vs. Li with about 700 mAh g$^{-1}$ by the equation MO+2Li$^+$+2e$^-$=M+Li$_2$O. Among these, NiO is appealing owing to its high theoretical capacity (718 mAh g$^{-1}$), environmental benignity and low cost. Nonetheless, it still suffers from low cycling stability and low rate capability resulting from large volume expansion and poor electrical conductivity, respectively.

To overcome these barriers, various NiO nanostructures are shown to accommodate mechanical strain during cycling, to improve electrical contact and shorten ion diffusion length to reduce resistivity. Three-dimensional curved NiO nanomembranes synthesized by electron beam evaporation demonstrate high capacity (721 mAh g$^{-1}$) at 1.5 C over 1400 cycles and high rate capability at 50 C with about 60 mAh per gram. However, costly processes relying on high vacuum system prevent it from large scale production. NiO nanorods anchored on Ni foam by anodization in oxalic acid at 50 V followed by annealing in air at 400° C. exhibit 706 mAh g$^{-1}$ at 1 A per gram. Nevertheless, high voltage anodization utilizing electricity renders the process expensive. Relatively thick wall of the nanorods (200-500 nm) result in rapid Coulombic efficiency drop to about 98% after only 70 cycles. NiO nanofibers with diameters about 100 nm prepared by electrospinning and air annealing at 800° C. show maximum capacity 784 mAh g$^{-1}$ at 80 mA g$^{-1}$ with low capacity retention (about 75%) after 100 cycles. The addition of carbon additive and binder further decrease the specific capacity of the electrode. Ni/NiO nanofoam with skeleton diameter 200-300 nm formed by burning nickel nitrate with 2-methoxyethanol followed by oxidation at 350° C. leads to 835 mAh g$^{-1}$ at 0.5 C after 200 cycles. However, long cycle stability is still questionable since capacity retention is only 85% after 200 cycles. Accordingly, improved NiO nanostructures with high capacity, energy density, rate capability and cycling stability are still highly desired.

Since NiO can be derived from Ni metal simply by annealing in air, NiO nanostructures can be obtained if Ni can be fabricated into nano-sized framework. Nano-Ni foam structures composed of Ni nanowires deposited with SnO$_2$ by atomic layer deposition produce good stability, high capacity and rate performance in Li-ion anode. Nanofoams composed of Ni nanowires (100-1000 nm dia.) can be created by refluxing glycerol and nickel acetate (Ni(Ac)$_2$) at about 300-400° C. and atmospheric pressure. Surface area of Ni metal can be further enlarged to Ni oxalate nanowires or nanosheets by oxalic acid etching, while Ni metal phase can be resumed by annealing Ni oxalate under reducing or inert atmospheres. In one example, NiO-decorated Ni nanowires (dia. about 30-150 nm) derived from micro-sized Ni wire backbone (about 2 µm in dia.) are directly grown on Ni foam as an innovated anode for Li-ion batteries. Micro-sized Ni wires are synthesized on Ni foam by heating with Ni(Ac)$_2$/glycerol solution at 400° C. Ni oxalate nanoneedles (dia. about 30-70 nm) are derived from Ni wires by oxalic acid treatment at 80° C. to further increase the surface area of the electrode. Ni nanowires can be obtained by reducing Ni oxalate nanoneedles with hydrogen at 350° C. NiO is formed on Ni nanowires by calcination in air from 350 to 450° C. This NiO anode demonstrates high stability with capacity 680 mAh g$^{-1}$ after 1000$^{th}$ cycle at 0.5 C, where 1 C=718 mA g$^{-1}$. Even though the anode is cycled at extremely high current rate, such as 20 C and 50 C, the capacities can still be about 164 and 75 mAh g$^{-1}$, respectively, which exhibit the good rate capability of this nanostructured NiO anode. This carbon-less and binder-less NiO nanowire foam (NWF) anode possesses low equivalent series resistance (ESR) about 3.5Ω, resulting in superior power performance and low resistive losses. The NiO NWF can be manufactured with eco-friendly chemicals, low temperature processes without any templates, binders and conductive additives, which might be easily transferred from lab scale to massive production.

Materials Synthesis

The following example is included as one method of forming nickel based nanostructures. Other variations on this example will be recognized by one of ordinary skill in the art, having the benefit of the present disclosure. Other variations of this example are within the scope of the invention.

Ni foam (MTI Corp., EQ-bcnf-16m) with 15 mm diameter was first flattened to thickness about 120 µm. Flat Ni foam was immersed in a 10 ml beaker filled with a solution of 2.5 ml 0.08 M nickel acetate tetrahydrate (Ni(Ac)$_2$.4H$_2$O, Sigma-Aldrich, 98%) in glycerol (Acros, 99+%) heated at 400° C. on a hotplate for 40 min without stirring with Al foil cover to prevent excess solvent evaporation. After growth, Ni wires attached on Ni foam were washed with deionized water 15 times to remove extra glycerol and Ni ions, and dried on a hotplate at 120° C. for 5 min. Magnetic stir rotor inside the hotplate provided the magnetic field for the alignment of Ni wire growth. Total Ni wire weight attached on Ni foam was about 7.5 to 8 mg. Freshly prepared 2 ml solution of 0.3 M oxalic acid dihydrate (ICN Biomedicals Inc., reagent grade) in ethanol (Decon Lab. Inc., 200 proof) with 10 wt % deionized water was used to etch the Ni wires at 80° C. for 1.5 h on hotplate into Ni oxalate needle-like nanostructures[13], which were further reduced back to Ni nanowires in a tube furnace with H$_2$ (50 sccm), Ar (100 sccm) at 20 torr for 10 min at 350° C. with ramping rate 30° C. min$^{-1}$. For NiO growth, Ni nanowires attached on Ni foam were heated in a tube furnace flowed with air from room temperature to 450° C. with ramping rate 2° C. min$^{-1}$, and the NiO-decorated Ni NWF electrode was taken out of the furnace immediately without holding at elevated temperature to control the oxide loading. NiO loading was equal to Δm*[M.W. of NiO]/[M.W. of O]=Δm*74.69/16, where Δm is the weight difference of the electrode before and after oxidation according to the reaction 2Ni+O$_2$=2NiO[9]. NiO loading was about 0.5 mg cm$^{-2}$ per electrode.

Surface morphology and elemental analysis were performed by scanning electron microscopy (SEM, FEI NovaNanoSEM 450) with energy dispersive X-ray spectroscopic (EDX) detector. Crystal structures were examined by X-ray diffraction (XRD, PANalytical Empyrean) with Cu-Kα radiation. Raman spectroscopy (Renishaw DXR) utilizing 532 nm laser with 8 mW excitation power and 100× objective lens was used to characterize NiO NWF electrode. Chemical states of NiO were examined by X-ray photoelectron spectroscopy (XPS, Kratos AXIS ULTRA DLD XPS system) with Al Kα monochromated X-ray source and 165-mm mean radius electron energy hemispherical analyzer. Thermogravimetric analysis (TGA, TA instruments, SDT Q600) was performed on the electrode with air from room temperature to 700° C. with 2° C. min$^{-1}$ to determine the weight change and oxidation temperature of the NiO NWF electrode. N$_2$ adsorption/desorption for Brunauer-Emmett-Teller (BET) surface were measured on NiO NWF electrodes at 77 K on a Micromeritics ASAP 2020 analyzer.

Electrochemical performance of the NiO NWF anode was evaluated in two-electrode half-cell configuration with Li foil (MTI Corp.) counter electrode in CR2032 coin cell (MTI Corp.) using electrolyte comprising 1 M $LiPF_6$ (Sigma-Aldrich, battery grade) in fluoroethylene carbonate (FEC, Sigma-Aldrich, 99%) and dimethyl carbonate (DMC, Sigma-Aldrich, anhydrous) in FEC:DMC 1:1 (v/v) ratio. Cells were assembled in an Ar filled glovebox (VAC Omnilab) with moisture and oxygen concentration below 1 ppm. Porous membrane (Celgard 3501) was used as the separator. Cyclic voltammetry (CV) was scanned at 0.1 mV s$^{-1}$ in the range 3.0 to 0.02 V (vs. Li/Li$^+$) with Biologic VMP3. Galvanostatic charge-discharge and cycling measurements were investigated in 3.0 to 0.02 V (vs. Li/Li$^+$) with various current rates by Arbin BT2000. Electrochemical impedance spectroscopy (EIS) at $E_{we}$=3.0 V (vs. Li/Li$^+$) between 10 mHz to 1 MHz with amplitude 10 mV were performed with Biologic VMP3.

Figure 2:
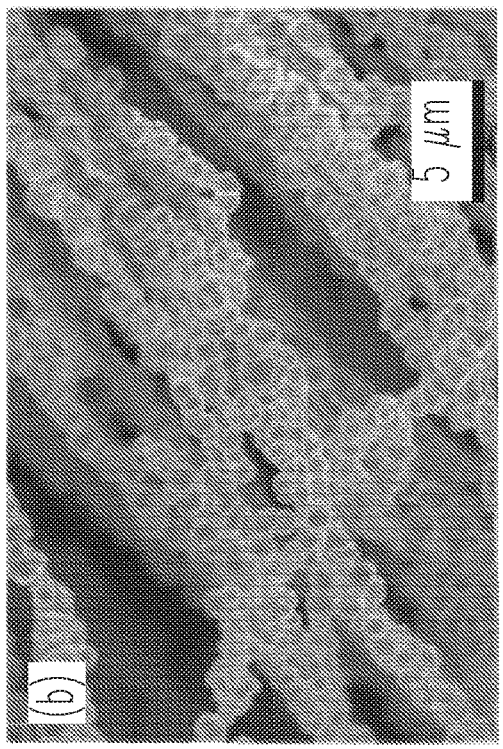
FIG. 2 shows SEM images of (b) Ni wires, (c) Ni oxalate nanoneedles, (d) Ni nanowires and (e) NiO NWF according to an example of the invention.
Figure 2:
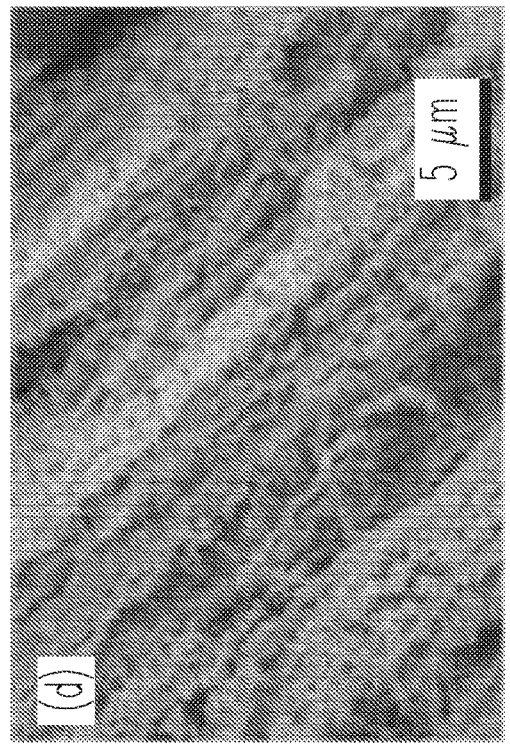
Figure 2:
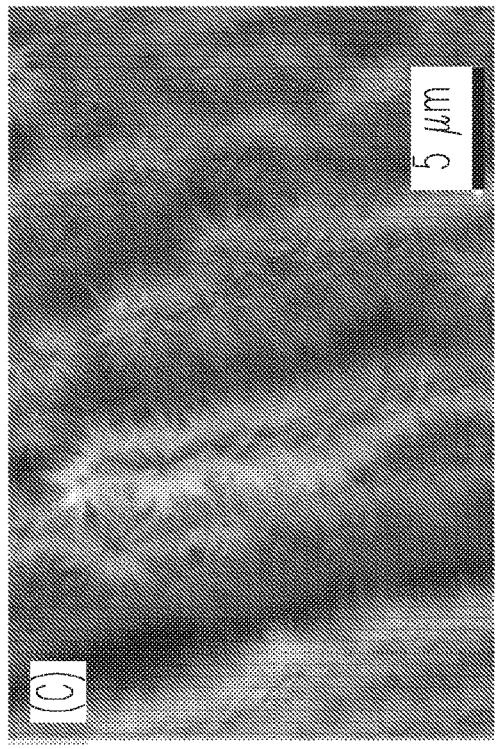
Figure 2:
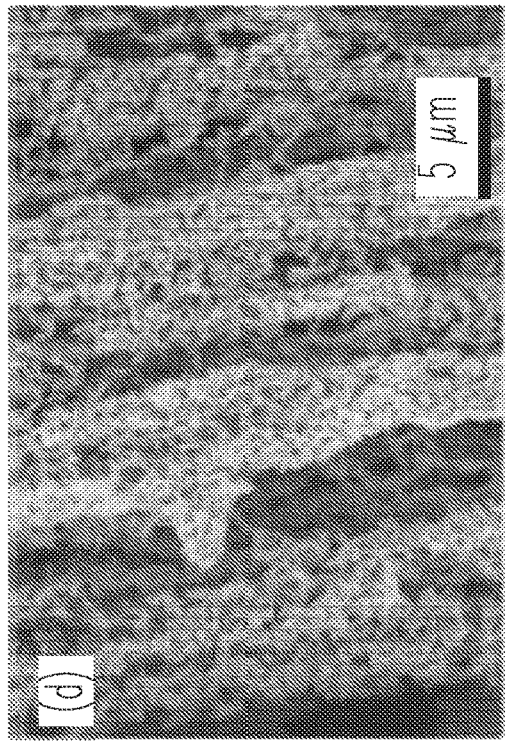
Figure 3:
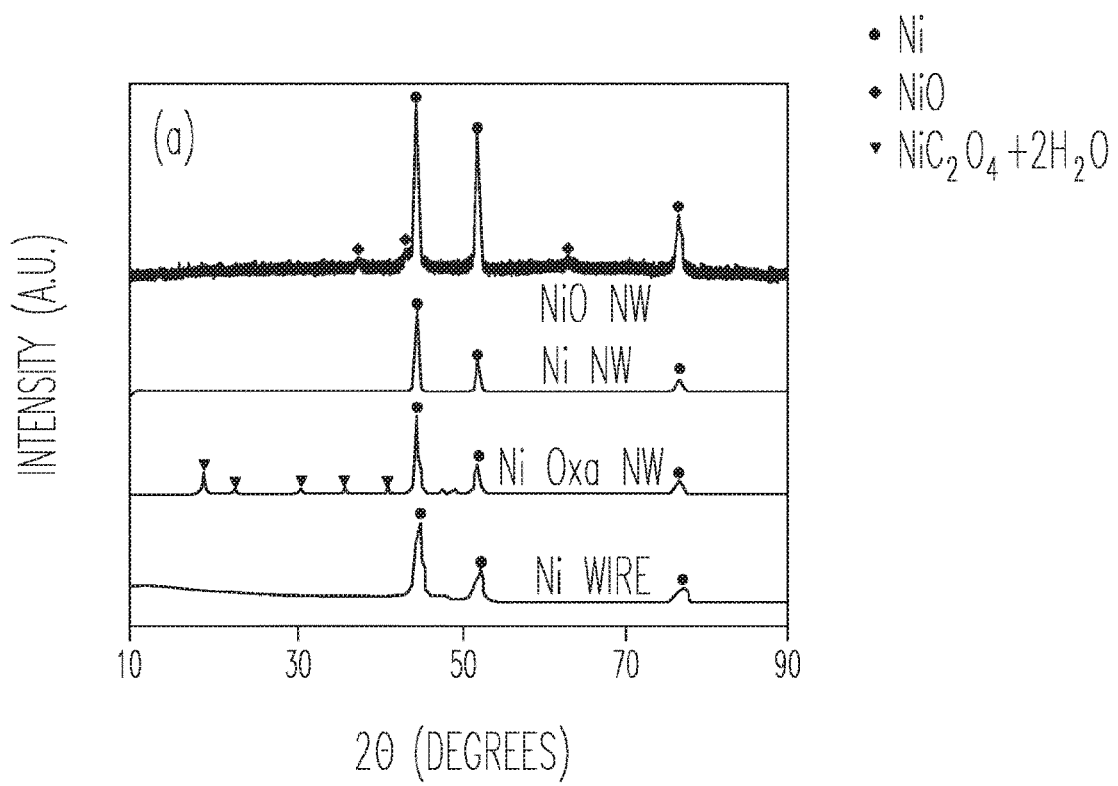
FIG. 3 shows (a) XRD patterns of Ni wire, Ni oxalate nanowire (Ni Oxa NW), Ni nanowire (Ni NW) foam, and NiO NW foam. (b) Raman spectrum of the NiO NWF according to an example of the invention.
Figure 3:
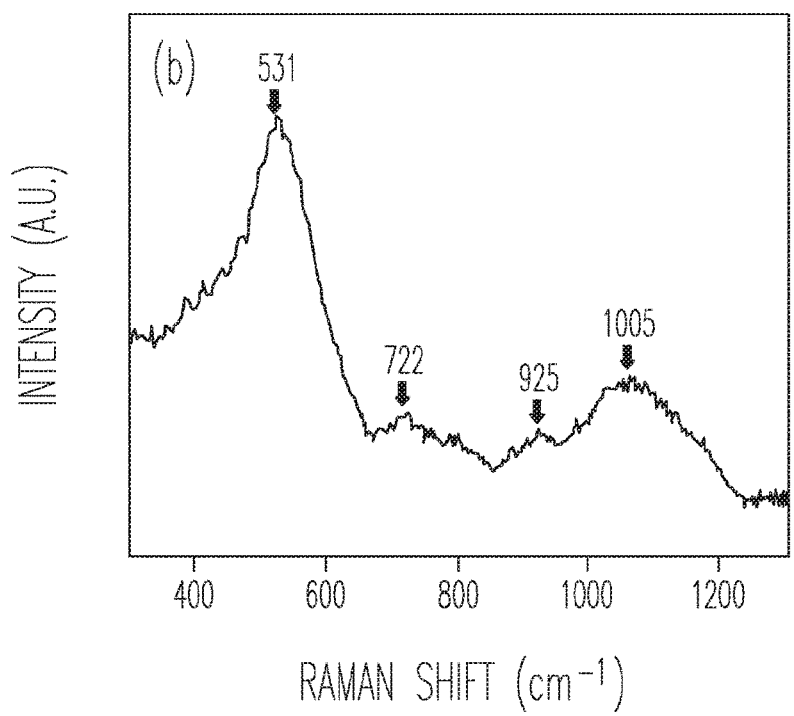
Figure 10:
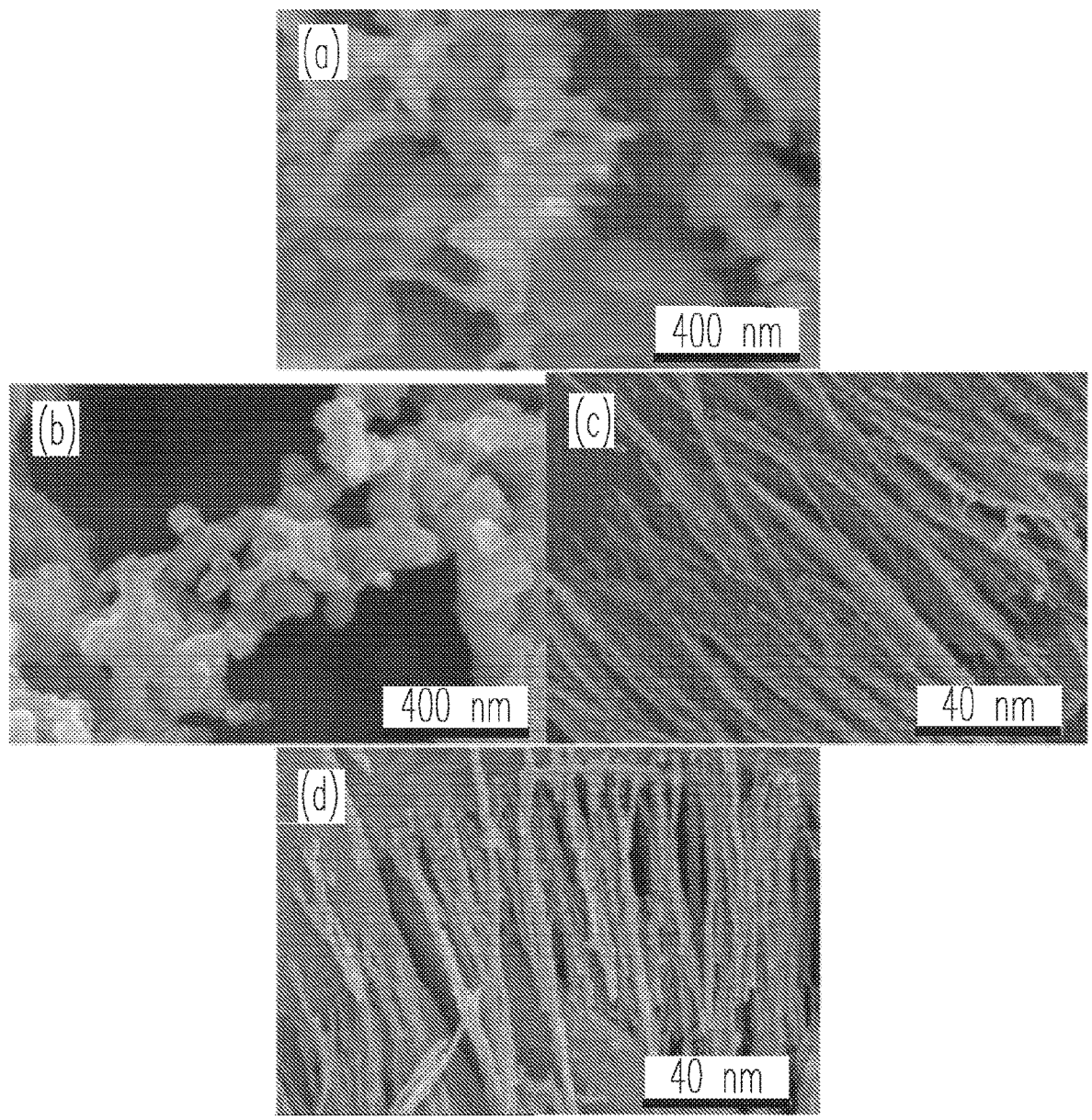
FIG. 10 shows SEM images with large magnification for (a) Ni nanowire and (b) NiO nanowire foam, and low magnification for (c) Ni nanowire and (d) NiO nanowire foam, where the visual cues indicate Ni foam strut surface is coated with Ni and NiO nanowires, respectively. (e) Nitrogen adsorption-desorption isotherms and (f) pore size distribution of NiO nanowire foam according to an example of the invention.
Figure 10:
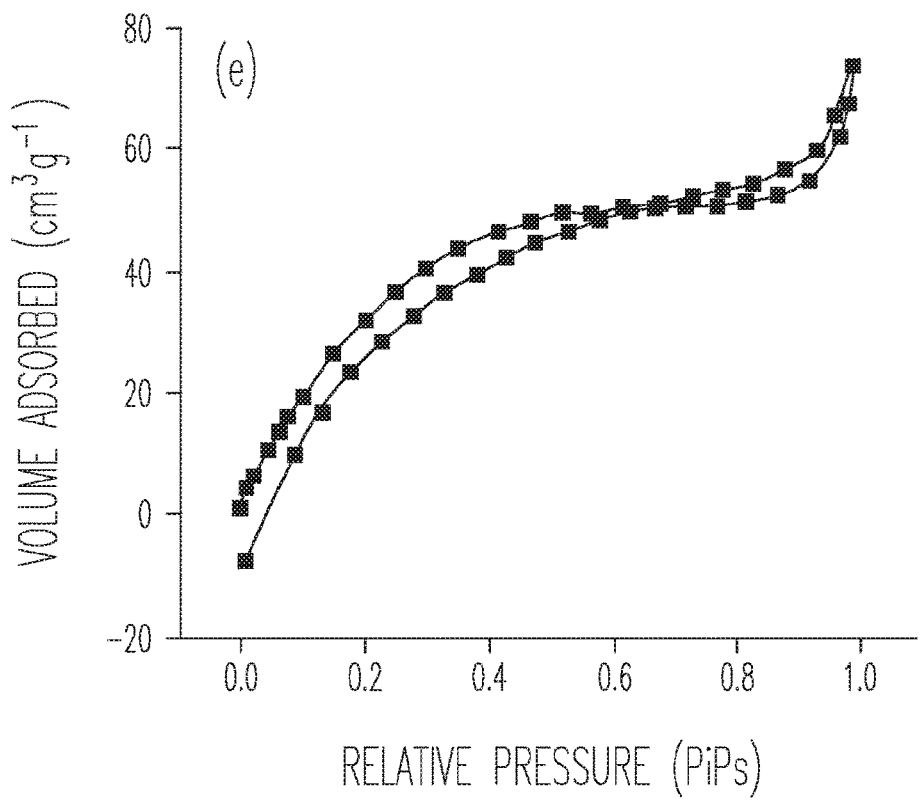
Figure 10:
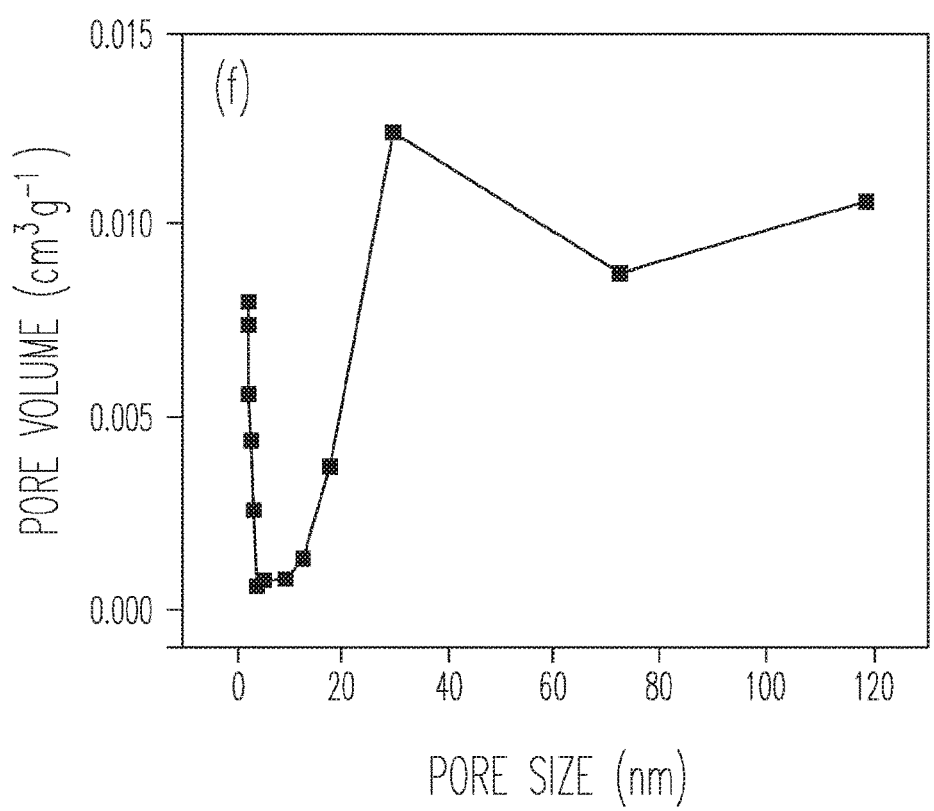
Figure 11:
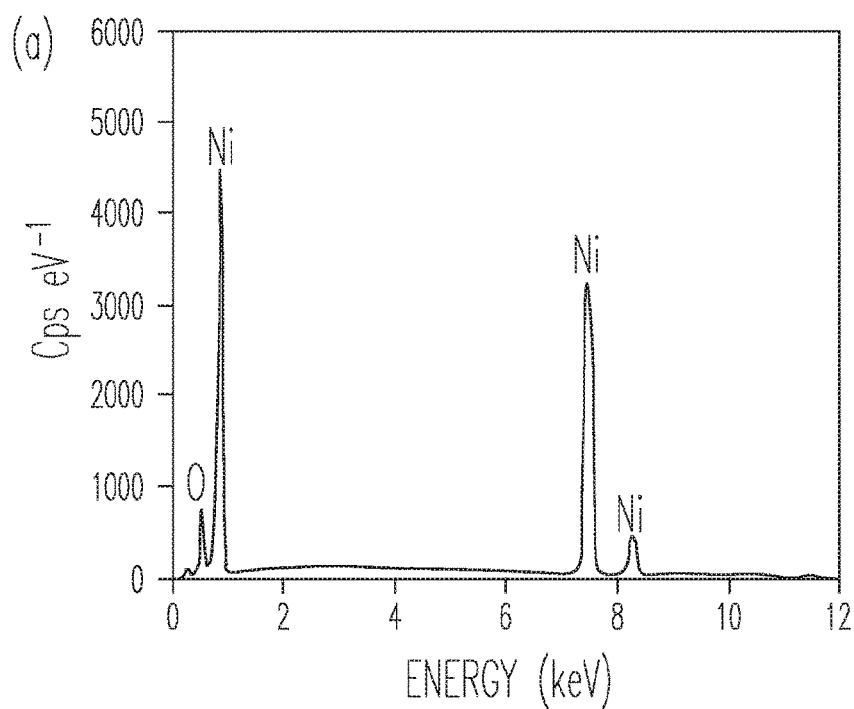
FIG. 11 shows (a) EDX spectrum of NiO NWF. (b) Electron image of NiO NWF, and EDX elemental maps of (c) Ni and (d) O according to an example of the invention.
Figure 11:
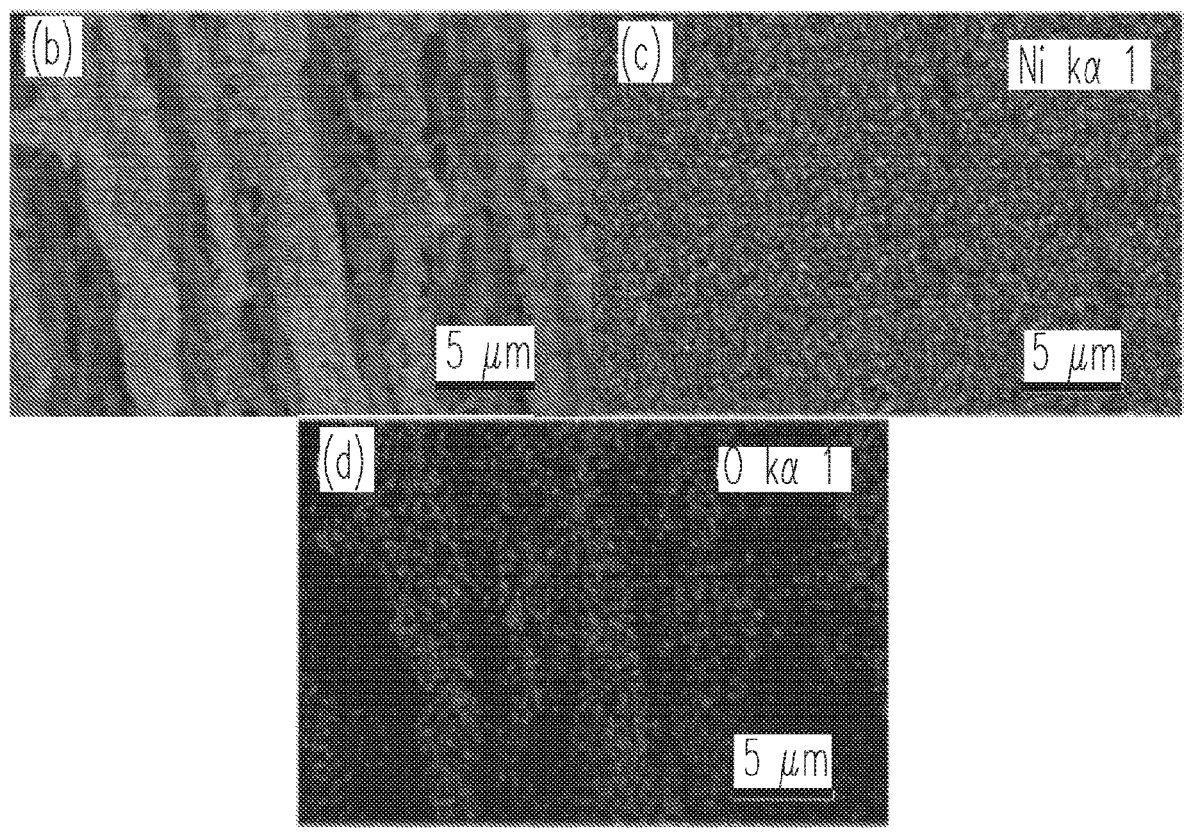
Figure 12:
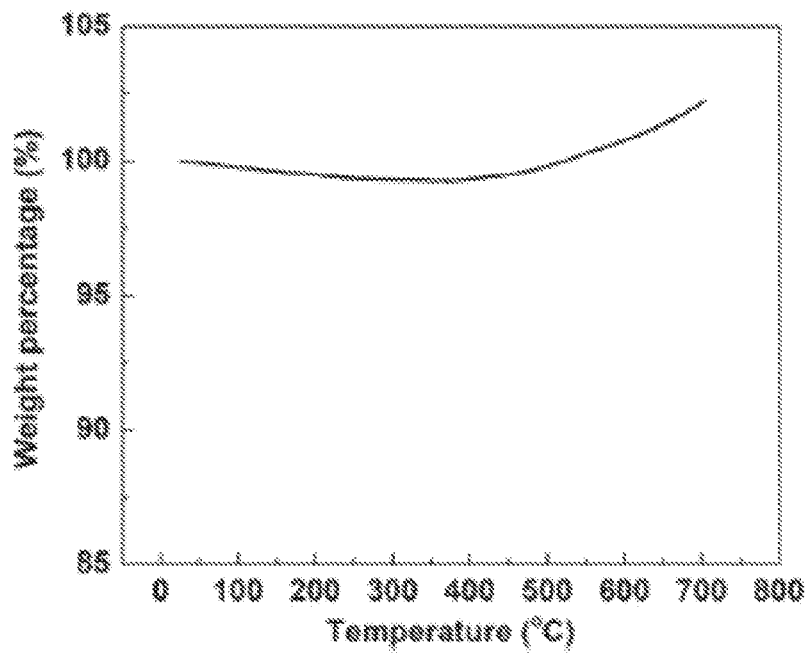
FIG. 12 shows TGA curve of oxidation of Ni NWF into NiO NWF with air from room temperature to 700° C. with 2° C. min$^{-1}$ according to an example of the invention.

Porous NiO NWF anode with large surface area can accommodate volume expansion during lithiation/delithiation, allow fast lithium ion transportation and provide intimate contact between the active materials and the current collector. Synthetic procedures and the scanning electron microscopic (SEM) images of the NiO NWF are shown in FIGS. 1 and 2. Ni foam is directly immersed in a solution of 0.08 M Ni(Ac)$_2$/glycerol at 400° C. and atmospheric pressure. Ni$^{2+}$ ions reduced by glycerol nucleate into Ni polyhedral nanoparticles which are further grown into microsized Ni wires under the magnetic field of the magnetic stir rotor inside the hotplate (FIGS. 2a and b). The practicability of template-less and self-assembled synthesis of ferromagnetic materials into nanowires has been shown by metallic Ni nanowire nonwoven clothes as potential NiO anode for Li-ion batteries. The as-synthesized Ni wires demonstrate X-ray diffraction (XRD) peaks at 45.1°, 52.5° and 76.9°, revealing the characteristic of Ni metal phase (FIG. 3a). The surface area of the Ni wires can be increased by etching in 0.3 M oxalic acid/ethanol solution with 10 wt % water at 80° C. (FIG. 2c) by the formation of Ni oxalate nanowires, the existence of which is indicated by XRD peaks at 18.9°, 23.0°, 30.4°, 35.8°, and 41.2° (FIG. 3a, $NiC_2O_4 \cdot 2H_2O$, ref code 00-014-0742). By hydrogen reduction at 350° C., Ni oxalate can transform completely into Ni nanowire (FIG. 2d, FIG. 10 *a,c*) with the XRD patterns showing only Ni metallic phase without the presence of Ni oxalate (FIG. 3a). By annealing in air to 450° C., the Ni NWF can be covered with NiO layer (FIG. 1e, FIG. 10 *b,d*), XRD patterns of which show peaks at 37.2°, 43.4° and 63.0° (FIG. 3a) along with the metallic Ni patterns from the underlying Ni nanowires and Ni foam. Nitrogen adsorption-desorption isotherms and pore size distribution of NiO NWF (FIG. 10 *e-f*) exhibit mesoporous nature of the active materials. BET surface area of the NiO NWF is 143.43 m$^2$ g$^{-1}$, demonstrating the high specific surface area of the electrode. Uniform distribution of NiO on the Ni NWF is displayed by energy dispersive X-ray spectroscopic (EDX) analysis and elemental mapping (Supplementary Fig. S2). The existence of NiO is further demonstrated by Raman spectrum (FIG. 3b) showing four broad peaks corresponding to one-phonon longitudinal optical mode (LO at 531 cm$^{-1}$), two-phonon transverse optical mode (2TO at 722 cm$^{-1}$), TO+LO (at 925 cm$^{-1}$) and 2LO (at 1065 cm$^{-1}$) modes. Thermogravimetric analysis (TGA, FIG. 12) indicates NiO formation starts from about 350° C. and the Ni NWF is continuously oxidized with elevated temperature.

Figure 4:
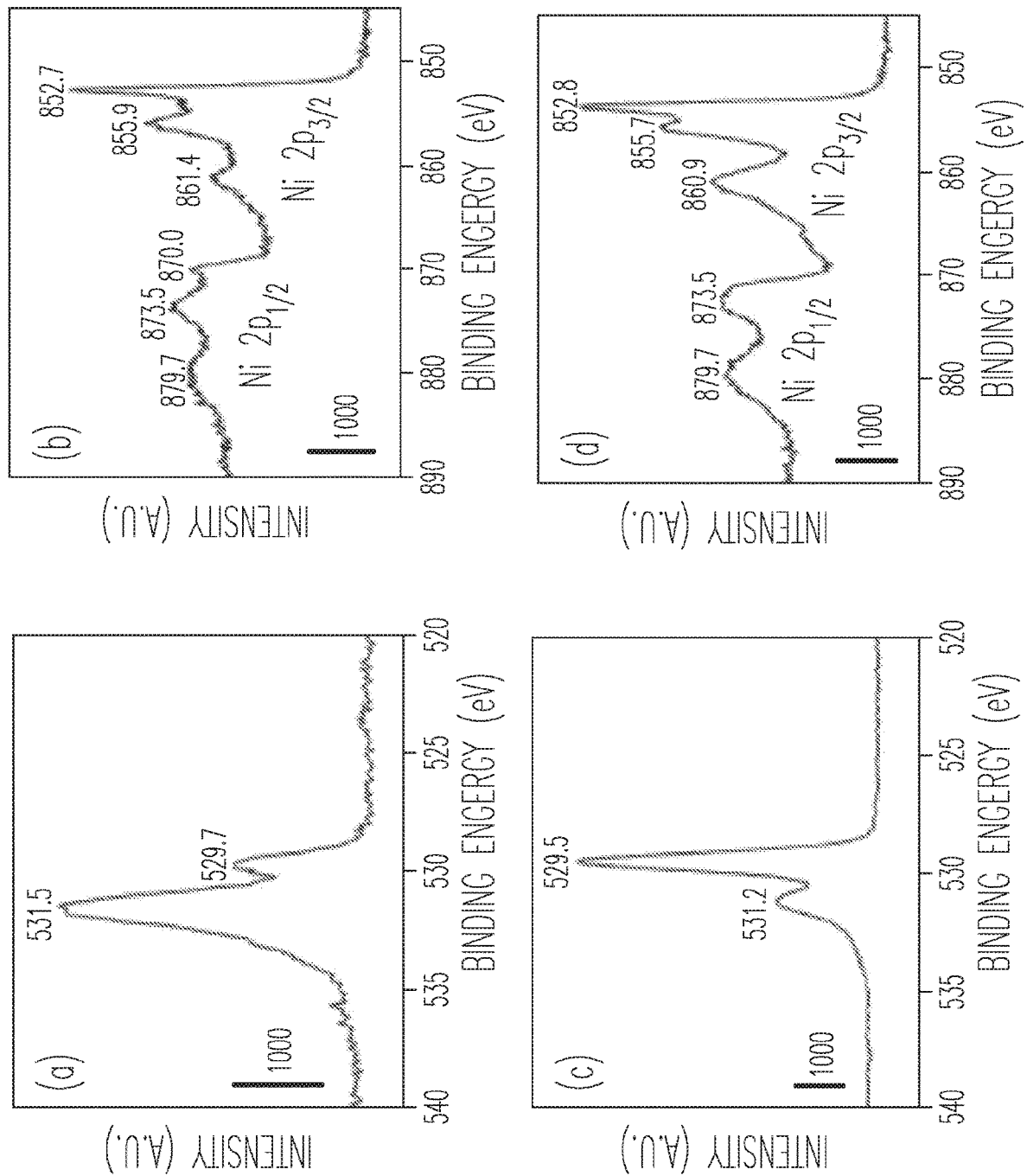
FIG. 4 shows XPS spectrum of Ni NWF for (a) O 1s and (b) Ni 2p levels, and of NiO NWF for (c) O 1s and (d) Ni 2p levels according to an example of the invention.
Figure 13:
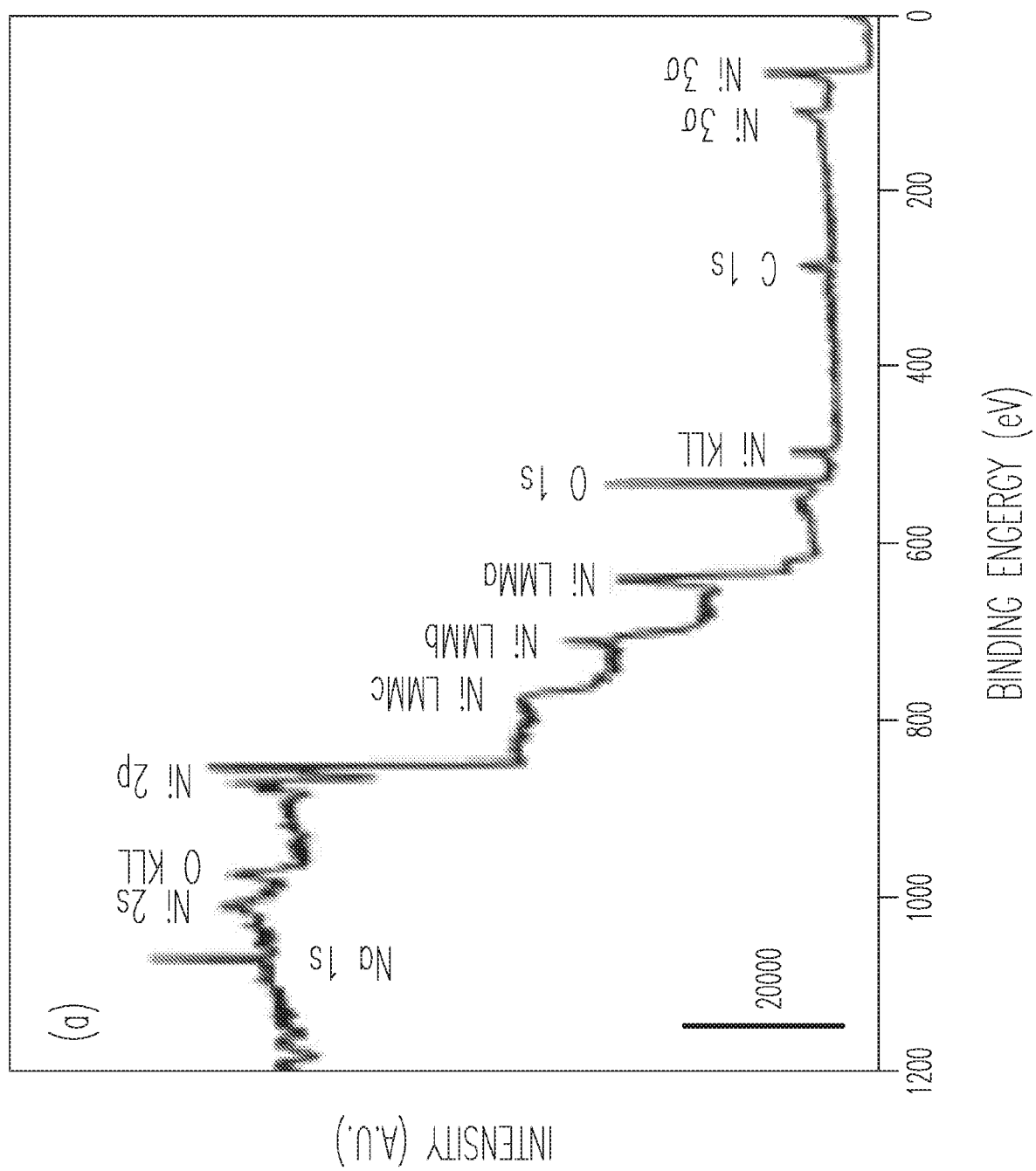
FIG. 13 shows Survey XPS spectrum of (a) Ni NWF and (b) NiO NWF according to an example of the invention.
Figure 13:
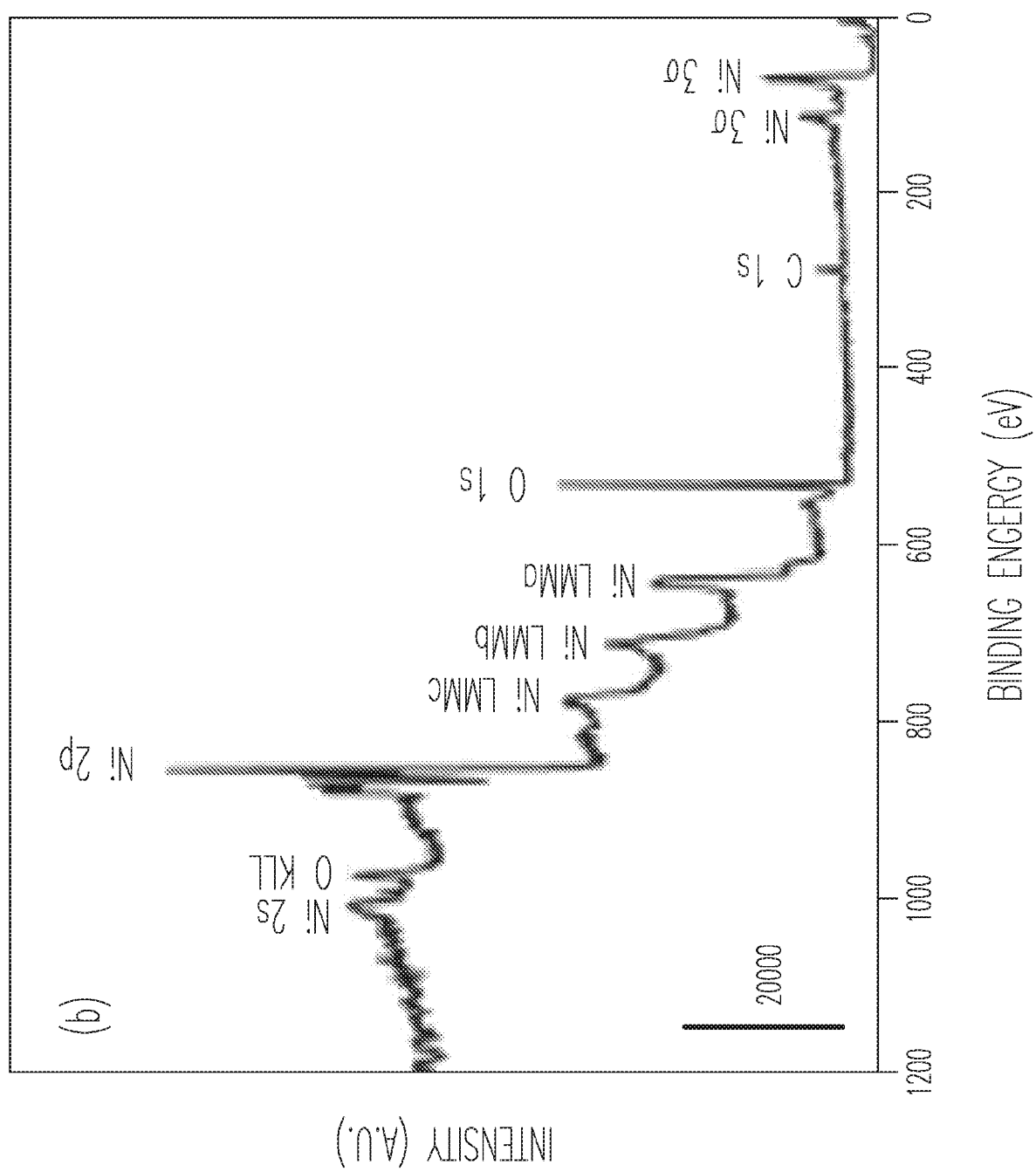

Ni and NiO NWF are investigated by X-ray photoelectron spectroscopy (XPS) to determine the valence states and composition with O 1s and Ni 2p core levels (FIG. 4). For Ni NWF, O 1s peaks (FIG. 4a) at about 531.5 eV and 529.7 eV are attributed to Ni$^{3+}$ from Ni$_2$O$_3$ and Ni$^{2+}$ from NiO, respectively, with stronger intensity from Ni$^{3+}$ since a Ni$_2$O$_3$ layer tends formed on metallic nickel in air. For NiO NWF, the O 1s peak of Ni$^{2+}$ at about 529.5 eV shows stronger signals than that of Ni$^{3+}$ at about 531.2 eV (FIG. 4c), demonstrating that NiO is the dominant species after air annealing. Signals from 870-885 eV and 850-865 eV correspond to Ni 2p$_{1/2}$ and Ni 2p$_{3/2}$ levels, respectively[8]. Metallic Ni peak detected in Ni NWF at about 852.7 eV is absent in NiO NWF, indicating good oxide layer coverage after oxidation without metallic backbone exposed. Peaks at 855.9 eV and 861.4 eV in Ni 2p$_{3/2}$ for Ni NWF further demonstrate Ni$_2$O$_3$ is the main surface composition, while peaks at 853.8, 855.7 and 860.9 eV for NiO NWF can be mainly attributed to Ni$^{2+}$ from NiO. Survey spectrum of Ni and NiO NWF are shown in FIG. 13.

Figure 5:
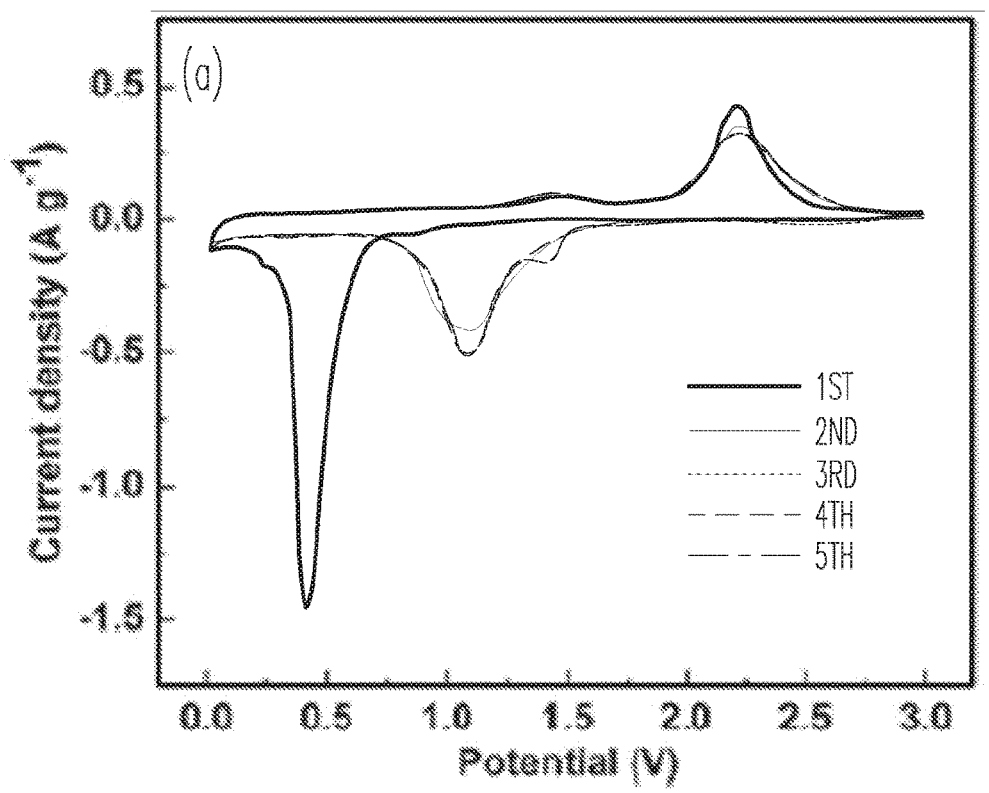
FIG. 5 shows (a) Cyclic voltammetric diagrams of the NiO NWF anode for 5 cycles with 0.1 mV s$^{-1}$. Charge-discharge curves of (b) selected cycles at 0.2 C (1 C=718 mA g$^{-1}$) and (c) at various C rates according to an example of the invention.
Figure 5:
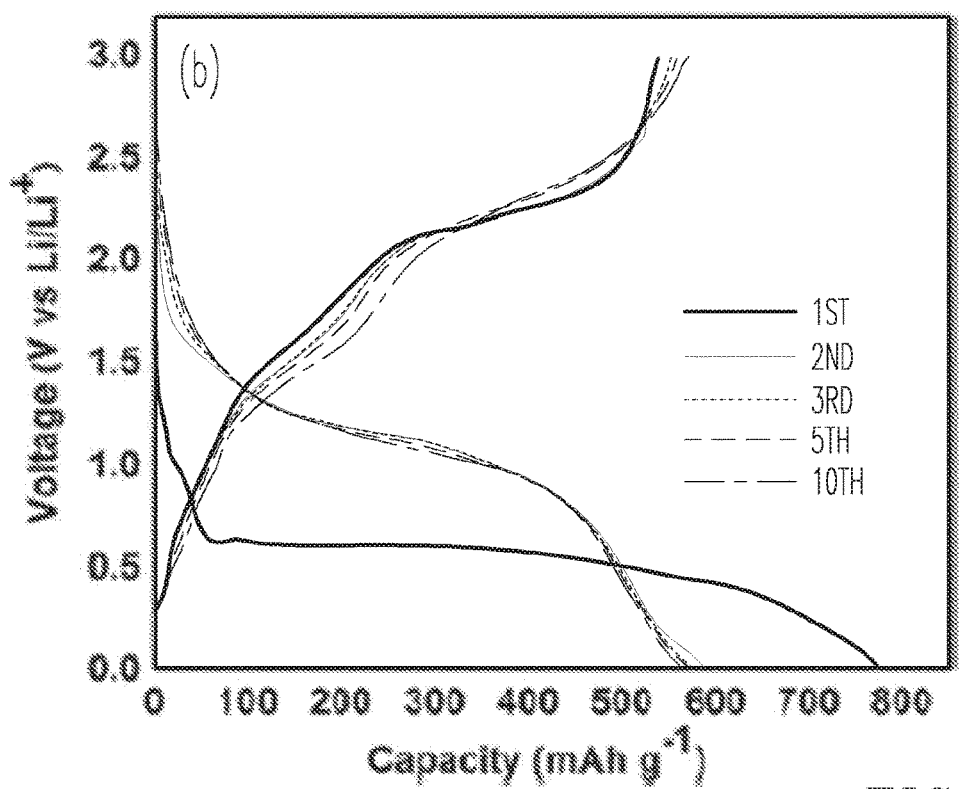
Figure 5:
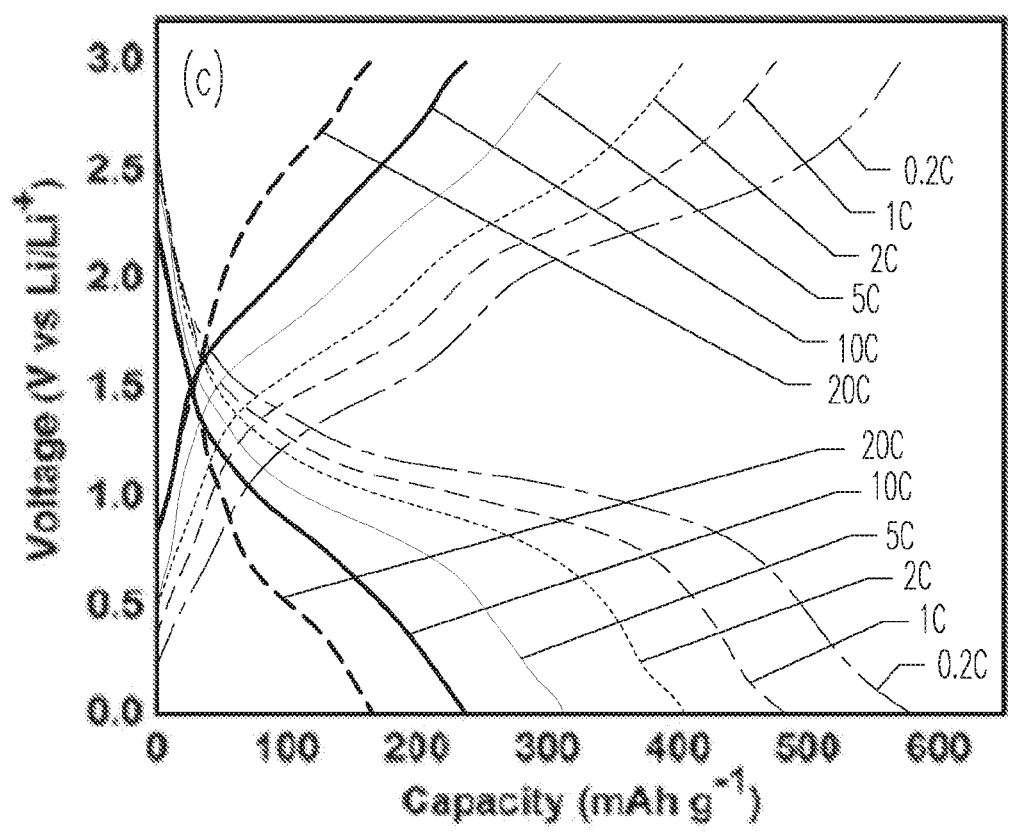

NiO NWF is tested as an anode in a two-electrode half-cell configuration with Li foil as the counter electrode. Cyclic voltammetric (CV) profiles are measured in the potential window 0.02-3.0 V at the scan rate 0.1 mV s$^{-1}$ (FIG. 5a). In the cathodic scan of the first cycle, an intense peak at about 0.41 V is attributed to the formation of solid electrolyte interface (SEI) layer, initial reduction of NiO and formation of Li$_2$O (NiO+2Li$^+$+2e$^- \rightarrow$Ni+Li$_2$O). In the following cycles, this discharge peak potential becomes weaker and move to about 1.09 V. During anodic scan, the broad peak at about 1.45 V and the stronger peak at about 2.23 V correspond to SEI layer decomposition and NiO formation/ Li$_2$O decomposition (Ni+Li$_2$O$\rightarrow$NiO+2Li$^+$+2e$^-$), respectively. Charge-discharge potential curves of the 1$^{st}$ to 10$^{th}$ cycles of the NiO NWF anode within the 0.02-3.0 V voltage window at the current rate 0.2 C (1 C=718 mA g$^{-1}$) are shown in FIG. 5b. For the 1$^{st}$ discharge, a potential plateau at about 0.6 V is observed. For the subsequent cycles, the discharge potentials is shifted to a slope from about 1.6 to 1.0 V, while the charge potential plateaus at about 1.5 V and 2.2 V are maintained, which is consistent with the CV results. The 1$^{st}$ cycle Coulombic efficiency (CE) of 70.0% calculated from 1$^{st}$ cycle charge capacity (541 mAh g$^{-1}$) divided by 1$^{st}$ cycle discharge capacity (773 mAh g$^{-1}$) can be attributed to the formation of SEI layer between the active materials and the electrolyte. The NiO NWF anode demonstrates discharge (577 mAh g$^{-1}$) and charge capacity (570 mAh g$^{-1}$) of the 10$^{th}$ cycle for CE of 98.8%, suggesting good recyclability of the electrode.

Figure 6:
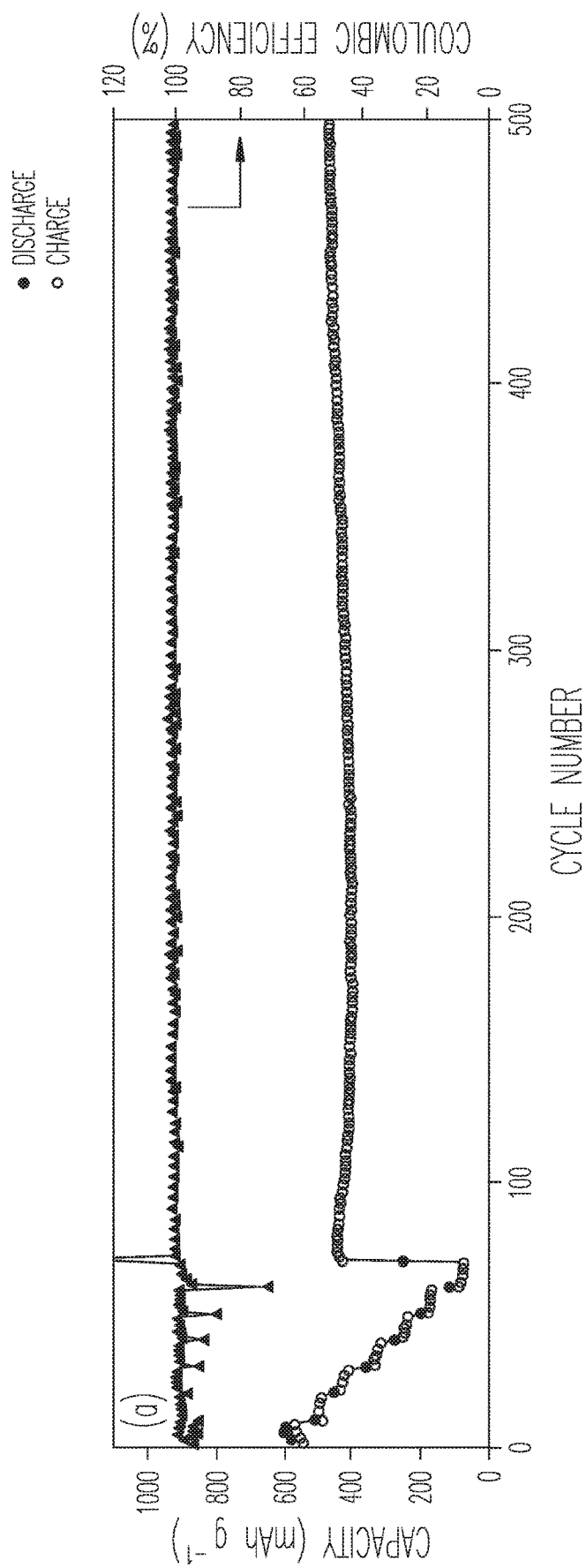
FIG. 6 shows (a) Rate capability of the NiO NWF anode with C rates ranging from 0.2 C to 50 C, and stability at 0.2 C for 430 cycles. (b) Discharge capacity of the NiO NWF anode started with 0.05 C followed by 0.5 C for 1000 cycles comparing with the capacity of graphite according to an example of the invention.
Figure 6:
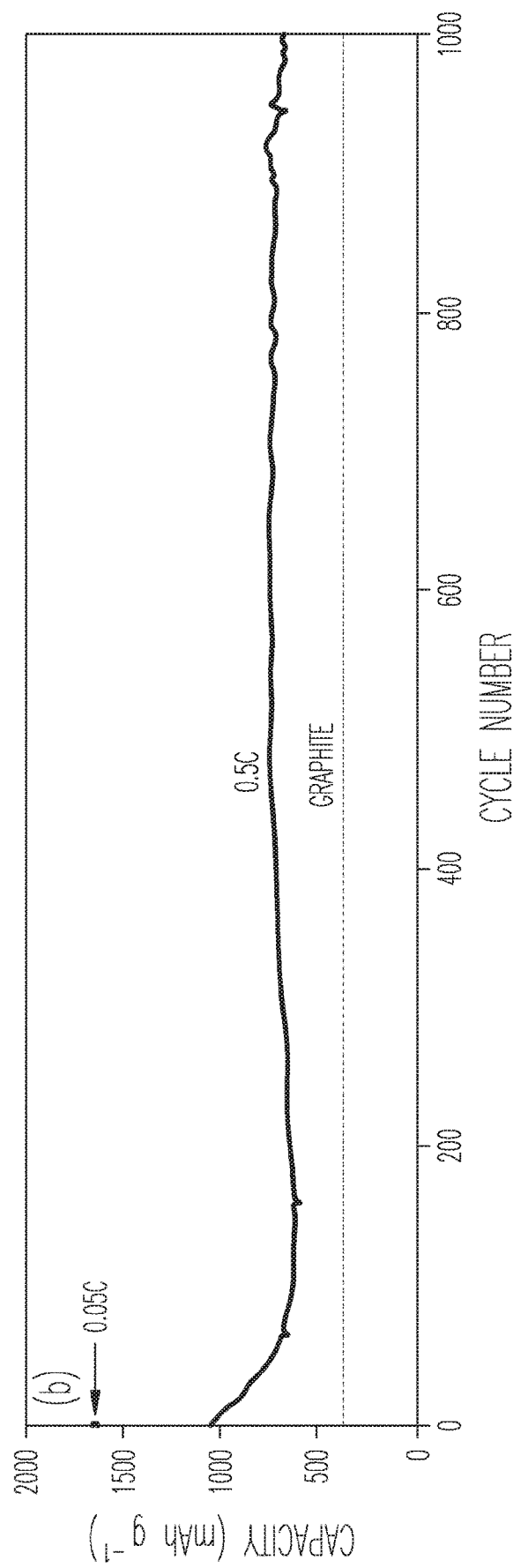

Charge-discharge voltage curves at various current rate from 0.2 C to 20 C are shown in FIG. 6c. Higher overpotentials (lower discharge and higher charge potentials) observed for higher C rates can be attributed to the kinetic effect of the electrode[8]. Similar curve shapes regardless of current density suggest good stability under high C rates. Discharge capacities at 0.2 C, 1 C, 2 C, 5 C, 10 C and 20 C are 577, 482, 406, 313, 236 and 164 mAh g$^{-1}$, respectively (FIG. 6a). Impressively, even at extremely high current rate (50 C=35900 mA g$^{-1}$), the capacity can still reach 75 mAh g$^{-1}$. The capacity can be resumed back to about 430 mAh g$^{-1}$ in 2 cycles when the current rate is lowered to 0.2 C, and the NiO NWF anode can still be stable for 430 cycles with 460 mAh g$^{-1}$ at 500$^{th}$ cycle with Coulombic efficiency fluctuates between 99.5-102.6%. The capacity recovery with lower current density can be explained as lower overpotentials of the charge-discharge process leading to longer charge-discharge time and thus larger capacities in a fixed potential range (i.e. 0.02-3.0 V), which is also observed in the literatures. Failure of the capacity recovery to the values of 0.2 C in the first 10 cycles might be attributed to the nanostructural change after cycling at ultra large current densities (e.g. 20 C and 50 C). However, the porous nature of the nanowire architecture can accommodate the mechanical strain to a certain degree and maintain its capacities in the following cycling process. The gradual increase in capacity and CE higher than 100% can be attributed to the activation of anode materials after cycling. The superior rate capability can be ascribed to the intimate electrical contact between NiO active materials and the conductive metallic Ni support, and the porous framework providing access for the electrolyte resulting in short ionic diffusion length. Compared to the 482 mAh g$^{-1}$ at 0.72 A g$^{-1}$ of NiO NWF, recent studies demonstrate higher capacities at similar current densities by decorating NiO nanosheets onto porous carbon supports, such as sulfonated polystyrene hollow particles (SPS) with 736 mAh g$^{-1}$ at 0.8 A g$^{-1}$ and carbon rods (CMK-3) with 824 mAh g$^{-1}$ at 0.8 A g$^{-1}$. Even though the high specific surface area of carbon supports promotes the rate capabilities of NiO, relatively lower 1st cycle Coulombic efficiencies (67% of SPS, ~30-50% of CMK-3) suggest larger amount of SEI layer formation during the first cycle leading to irreversible Li consumption of the cathode materials (e.g. LiCoO$_2$) and permanent capacity loss when utilized in full cells. Accordingly, improving rate capabilities without compromising 1$^{st}$ cycle Coulombic efficiencies still remains challenging of the state-of-the-art NiO electrodes.

Figure 14:
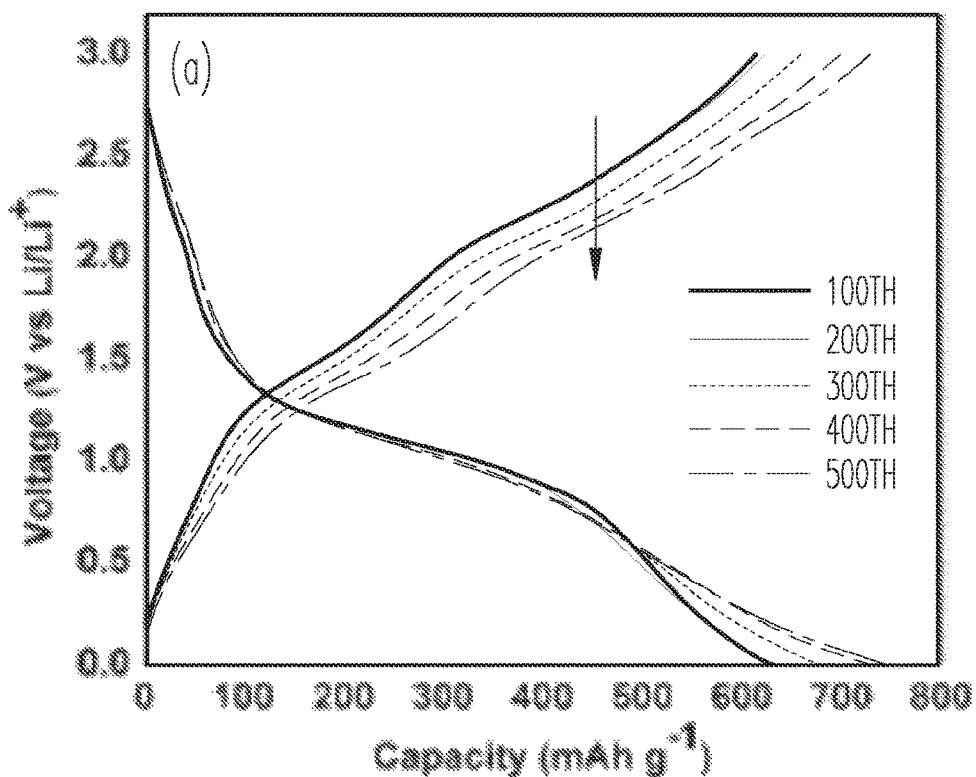
FIG. 14 shows Charge-discharge curves of NiO NWF anode for (a) 100$^{th}$ to 500$^{th}$ cycles and (b) 500$^{th}$ to 1000$^{th}$ cycles according to an example of the invention.
Figure 14:
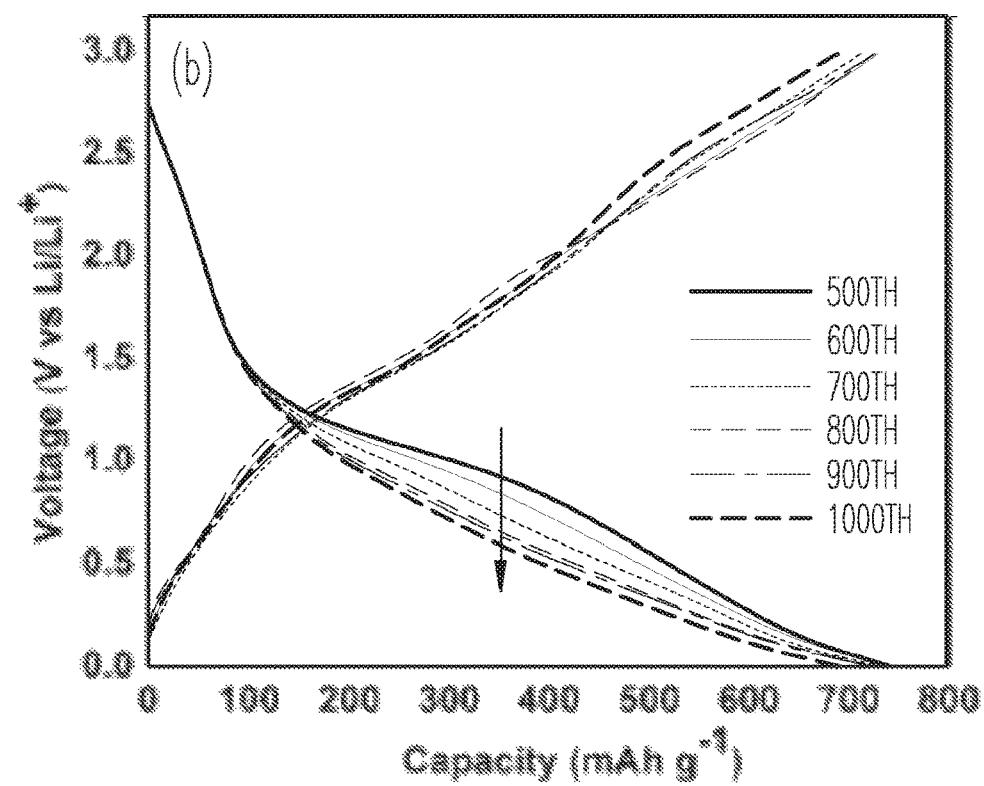

Cycling stability of the NiO NWF anode is further examined by cycling at 0.05 C for the first cycle followed by 0.5 C for 999 cycles in the potential window 0.02-3.0 V (FIG. 6b). Superior cycling performance is shown by initially capacity fading to 620 mAh g$^{-1}$ in 100 cycles, gradually increasing to 735 mAh g$^{-1}$ at the 500$^{th}$ cycle, holding steadily to 717 mAh g$^{-1}$ at the 900$^{th}$ cycle, and then slowly decreasing to 680 mAh g$^{-1}$ at the 1000$^{th}$ cycle, which is notably close to the theoretical value of NiO (718 mAh g$^{-1}$) and larger than traditional graphite (372 mAh g$^{-1}$) anode. Representative charge-discharge curves from the 100$^{th}$ to 500$^{th}$ cycles (FIG. 14) indicate gradual material activation with less polarization of delithiation. After 500 cycles, discharge curves start to lose the plateau with more polarization, suggesting higher energy necessary for lithiation, while similar charge curves are maintained until reaching the 1000$^{th}$ cycle (FIG. 14b).

Higher NiO loading (1.3 mg cm$^2$) can be achieved with ramping rate 30° C. min$^{-1}$ to higher temperature (500° C.) and kept at 500° C. for 1 h in air. Compared to 0.5 mg cm$^{-2}$, high temperature and elongated annealing time lead to higher NiO loading with stronger NiO reflections (FIG. 15a). Discharge capacities of 1.3 mg cm$^{-2}$ NiO (FIG. 15b) are similar to 0.5 mg cm$^{-2}$ at 1 C and 2 C. Nonetheless, capacities diminish to lower values after 5 C, which is attributed to the resistive nature of thicker NiO layer resulting in higher overpotentials at large current densities. Higher loading compromises the rate capability of the electrode. Accordingly, to further increase the areal loading, structural optimization could be performed on the NiO NWF, such as increasing areal density of Ni wire backbone by surface treatment of Ni foam, decreasing the diameter of Ni wire by variation of synthetic temperature or Ni(Ac)$_2$ concentrations, and water concentrations during oxalic acid etching to modify Ni oxalate nanostructures in the future study.

Figure 15:
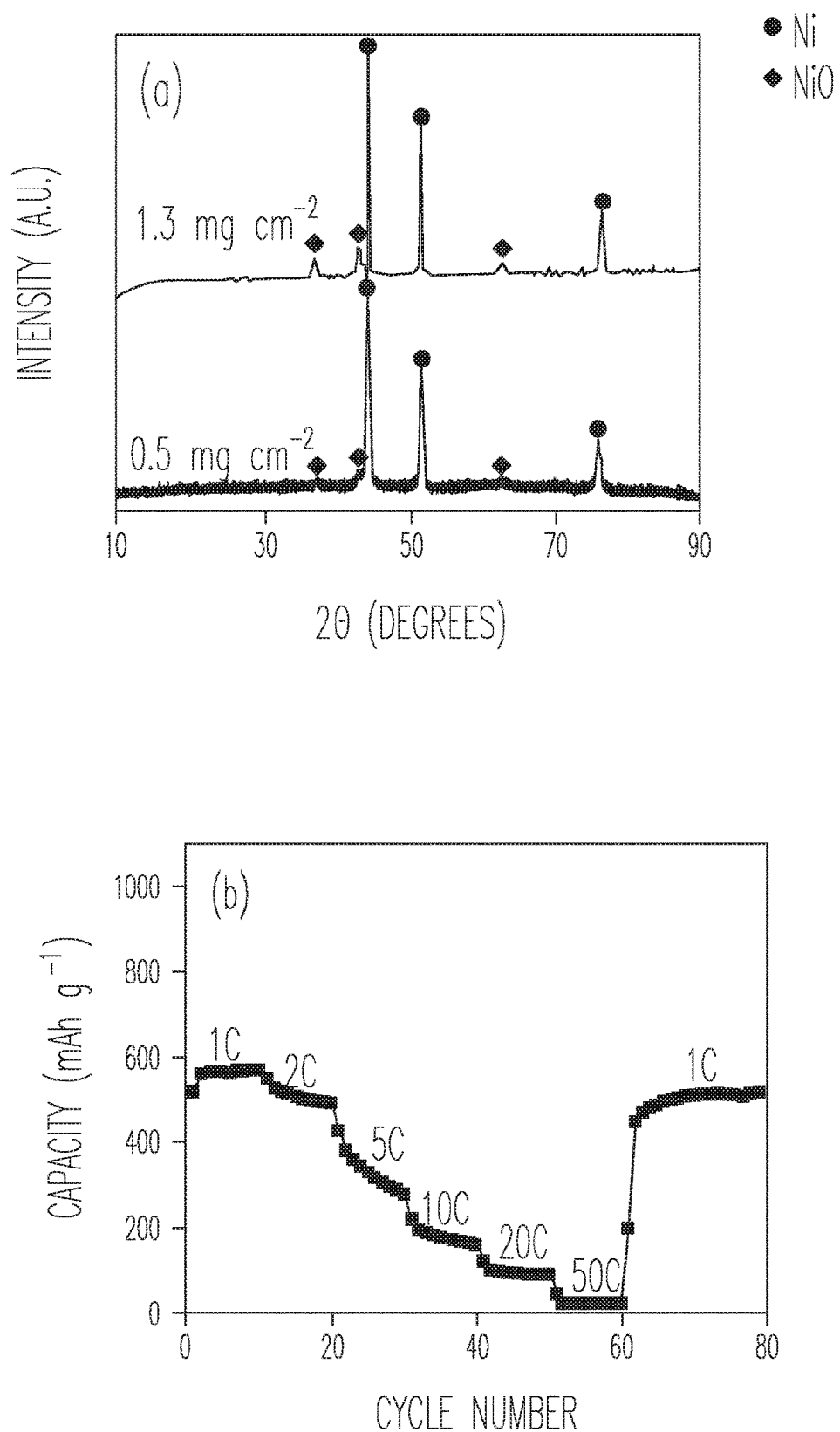
FIG. 15 shows (a) XRD patterns of NiO NWF with 0.5 and 1.3 mg cm$^{-2}$. (b) Discharge capacities of 1.3 mg cm$^{-2}$ NiO NWF electrode at various current densities. (c-e) SEM images of NiO NWF after 1000 cycles according to an example of the invention.
Figure 15:
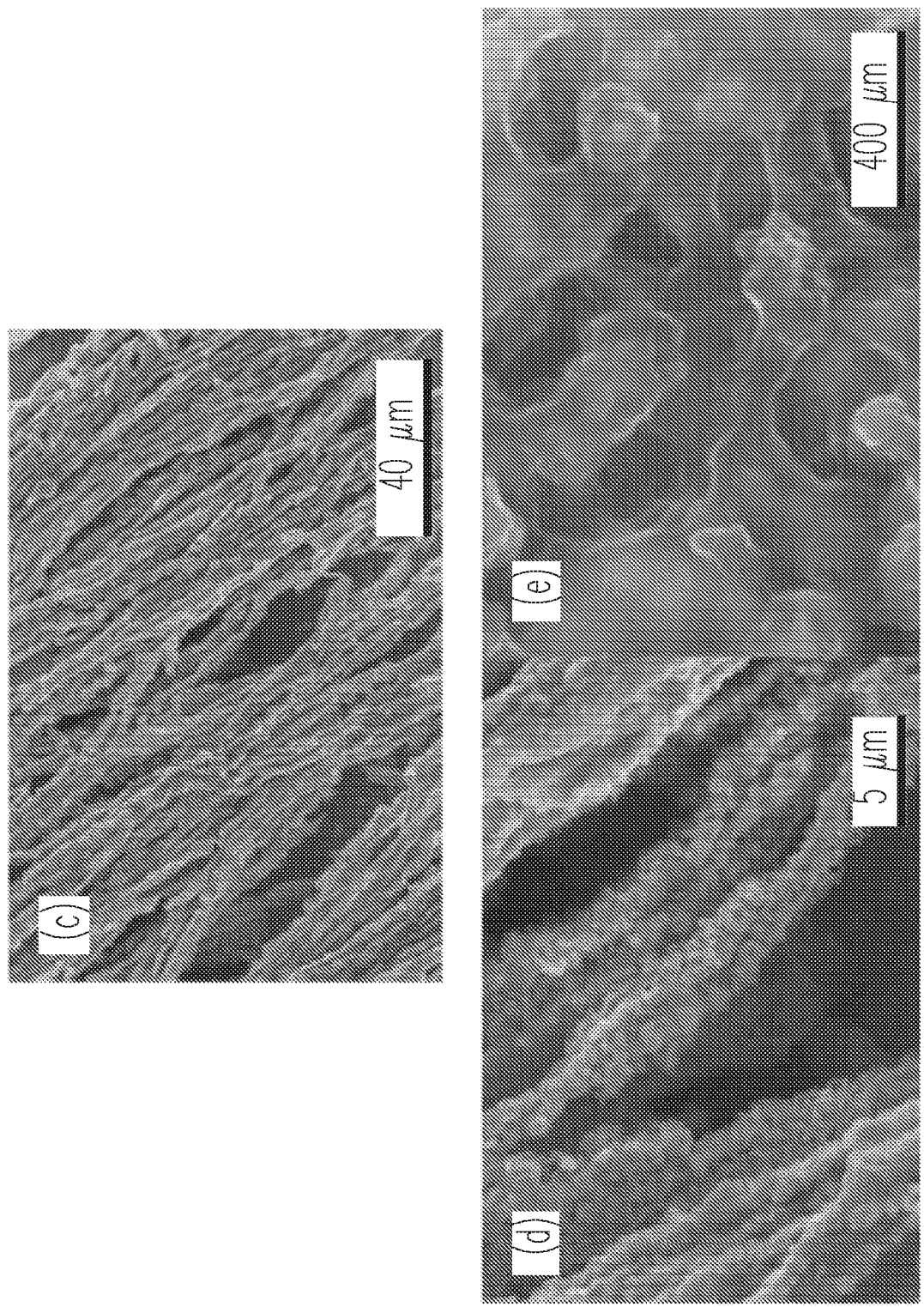

Superior stability of the NiO NWF is demonstrated in the SEM images after 1000 cycles (FIG. 15 c-e). Main structure consisting of Ni wire backbone is still intact (FIG. 15 c-d). While the void space between NiO nanowires is filled with SEI products (FIG. 15e), the shape of nanowires is discernible without obvious cracking or detachment, which further elucidate the ability of accommodation of mechanical strain of the NiO NWF electrode.

Figure 7:
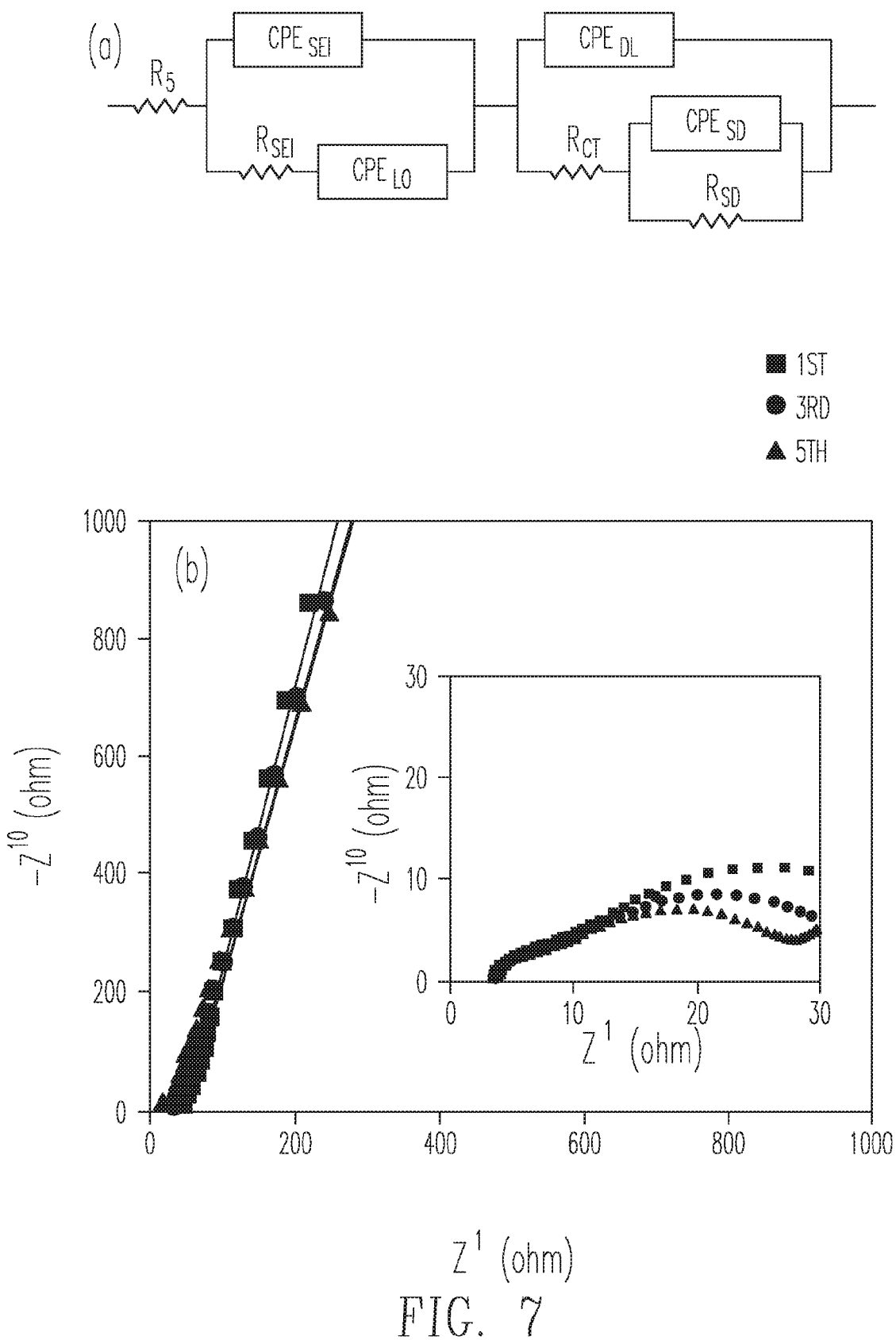
FIG. 7 shows EIS analysis of the NiO NWF with (a) the equivalent circuit and (b) the Nyquist plots of experimental results (solid symbols) and fitted results (solid lines) after 1, 3 and 5 CV cycles according to an example of the invention.

Electrochemical impedance spectroscopy (EIS) are performed to further verify the superior electrochemical performance of the NiO NWF anode after one, three and five CV cycles (FIG. 7). The equivalent circuit shown in FIG. 7a is used to fit the impedance data. Experimental results shown in solid symbols (FIG. 7b) are fitted by straight lines using parameters shown in Table 1.

TABLE 1

EIS fitting parameters of NiO NWF anode after 1$^{st}$, 3$^{rd}$ and 5$^{th}$ CV cycles

| Cycle | Rs (Ω) | R$_{SEI}$ (Ω) | R$_{CT}$ (Ω) | CPE$_{SEI}$ Q (μF s$^{n-1}$) | n | CPE$_{LD}$ Q (mF s$^{n-1}$) | n | CPE$_{DL}$ Q (μF s$^{n-1}$) | n | CPE$_{SD}$ Q (mF s$^{n-1}$) | n | R$_{SD}$ (kΩ) |
|---|---|---|---|---|---|---|---|---|---|---|---|---|
| 1$^{st}$ | 3.5 | 5 | 30 | 6 | 0.85 | 15 | 0.5 | 70 | 0.75 | 4.5 | 0.93 | 50 |
| 3$^{rd}$ | 3.5 | 5 | 23 | 5 | 0.82 | 15 | 0.5 | 65 | 0.73 | 6 | 0.92 | 50 |
| 5$^{th}$ | 3.5 | 5 | 18.5 | 7 | 0.78 | 16 | 0.5 | 60 | 0.75 | 8 | 0.92 | 50 |

Constant phase elements (CPEs) describing non-ideal capacitances with parameters Q analogous to capacitance and the ideality factor n are necessitated due to the existence of spatial and chemical non-uniformity across the electrode and the solid electrolyte interphase (SEI) surface. R$_S$ is the equivalent series resistance (ESR), which represents resistances of electrolyte, metallic leads, cell hardware, current collectors and electrode materials. The first parallel impedance branch in the equivalent circuit describes the SEI layers (R$_{SEI}$+CPE$_{SEI}$) and diffusion of lithium ions in liquid phase near the electrode surface (CPE$_{LD}$). The second impedance branch accounts for double-layer impedance (CPE$_{DL}$) and charge transfer resistance (R$_{CT}$) at the interface of electrolyte and active materials, and diffusion of lithium ions within the solid phase of the electrode (R$_{SD}$+CPE$_{SD}$). The first and second depressed semicircles (inset of FIG. 7b) with characteristic frequencies at about 9470 Hz and 455 Hz can be attributed to the SEI layers and charge transfer resistance, respectively. The low frequency impedance tail can be ascribed to lithium diffusion in the electrolyte and active materials, which is represented by CPE$_{LD}$ and CPE$_{SD}$+R$_{SD}$, respectively.

The results obtained from impedance data fitting demonstrate the stability of the NiO NWF anode. Charge-transfer resistance decreases by 38% between the first and the fifth cycle, which corresponds to the facilitation of lithium ion diffusion via electrolyte wetting. Resistance corresponding to the SEI layers (R$_{SEI}$) stays constant throughout the initial cycles. This reveals the formation of stable passivating layers in the first cycle, which alleviates capacity loss with cycling. The ideality n of SEI layers decreases slightly from 0.85 to 0.78, denoting minimal structural change during the first few cycles. The idealities of double layer capacitance and the diffusion capacitances do not change much, and ESR keeps constant during the initial cycles, which also suggest improved stability of the electrode.

In conclusion, we have developed NiO-decorated Ni nanowire foam with solution-based synthesis, low temperature hydrogen reduction followed by air annealing process. NiO NWF has been shown as a perspective anode for Li-ion batteries. Excellent stability with minimal capacity fading over 1000 cycles with 680 mAh $g^{-1}$ at 0.5 C, and good rate capability at very high current rates (20 C and 50 C, with about 164 and 75 mAh $g^{-1}$, respectively) indicate the superior electrochemical performance of the anode. Superb rate capability and stability can be evidenced with EIS results demonstrating low ESR of about 3.5Ω and stable electrochemical parameters with cycling, respectively. Simple production procedures utilizing liquid-based solution, eco-benign compounds and low temperature render the mass manufacturing of the NiO NWF anode plausible.

Figure 8:
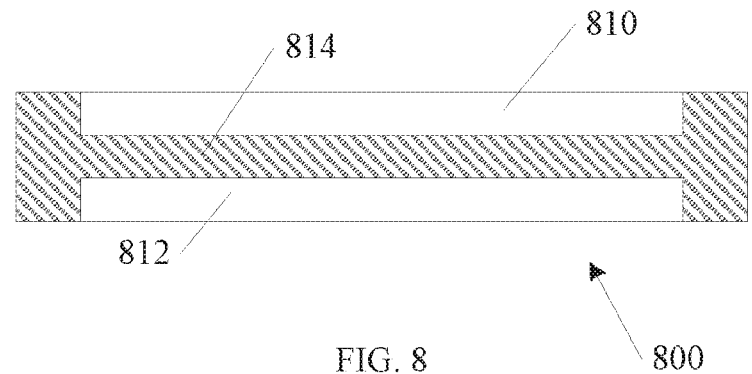
FIG. 8 shows a battery according to an example of the invention.

FIG. 8 shows an example of a battery 800 according to an embodiment of the invention. The battery 800 is shown including an anode 810 and a cathode 812. An electrolyte 814 is shown between the anode 810 and the cathode 812. In one example, the battery 800 is a lithium-ion battery. In one example, the anode 810 is formed from a nickel based nanostrucure as described in examples above. In one example, although the invention is not so limited, the battery 800 is formed to comply with a 2032 coin type form factor.

Figure 9:
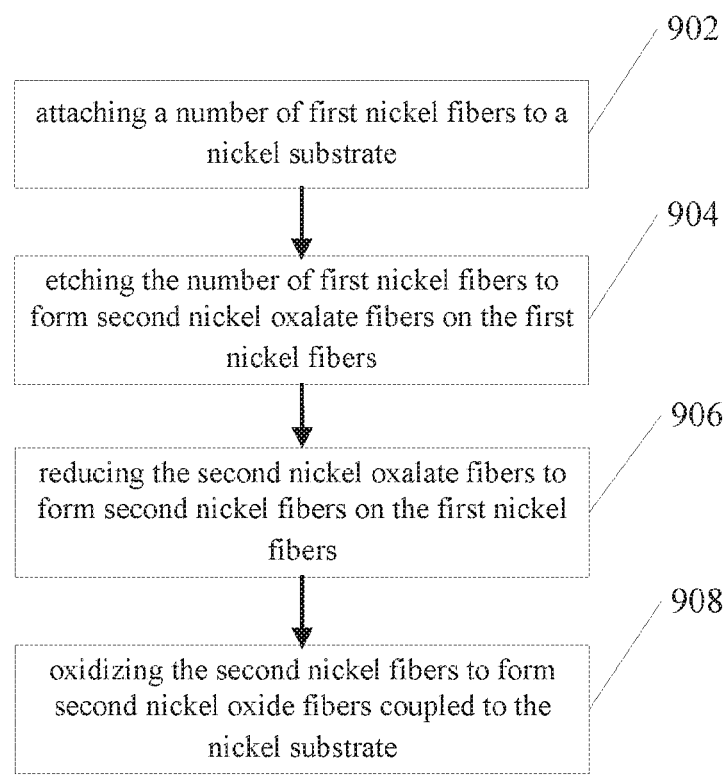
FIG. 9 shows a method of forming a material according to an example of the invention.

FIG. 9 shows an example method of forming according to an embodiment of the invention. In operation 902, a number of first nickel fibers are attached to a nickel substrate. In operation 904, the number of first nickel fibers are etched to form second nickel oxalate fibers on the first nickel fibers. In operation 906, the second nickel oxalate fibers are reduced to form second nickel fibers on the first nickel fibers. In operation 908, the second nickel fibers are oxidized to form second nickel oxide fibers coupled to the nickel substrate.

To better illustrate the method and apparatuses disclosed herein, a non-limiting list of examples is provided here:

Example 1 includes a battery including a first electrode. The first electrode includes a nickel substrate, a number of nickel oxide fibers coupled to the nickel substrate. The battery includes a second electrode, and an electrolyte in contact with both the first electrode and the second electrode.

Example 2 includes the battery of example 1, wherein the nickel substrate includes a nickel foam.

Example 3 includes the battery of any one of examples 1-2, wherein the nickel oxide fibers are coupled to nickel fibers that are in turn coupled to the nickel substrate.

Example 4 includes the battery of any one of examples 1-3, wherein the first electrode is configured as an anode.

Example 5 includes the battery of any one of examples 1-4, wherein the second electrode includes lithium metal.

Example 6 includes the battery of any one of examples 1-5, wherein the electrolyte includes $LiPF_6$.

Example 7 includes a method of forming a battery electrode, comprising attaching a number of first nickel fibers to a nickel substrate, etching the number of first nickel fibers to form second nickel oxalate fibers on the first nickel fibers, reducing the second nickel oxalate fibers to form second nickel fibers on the first nickel fibers, and oxidizing the second nickel fibers to form second nickel oxide fibers coupled to the nickel substrate.

Example 8 includes method of example 7, wherein attaching the number of first nickel fibers to the nickel substrate includes attaching to a nickel foam.

Example 9 includes method of any one of examples 7-8, wherein reducing the second nickel oxalate fibers includes reducing in hydrogen.

Example 10 includes method of any one of examples 7-9, wherein oxidizing the second nickel fibers includes oxidizing in air.

These and other examples and features of the present electrodes, and related methods will be set forth in part in the above detailed description. This overview is intended to provide non-limiting examples of the present subject matter—it is not intended to provide an exclusive or exhaustive explanation.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A battery, comprising:
   a first electrode, including:
     a nickel substrate;
     a number of nickel oxide fibers coupled to the nickel substrate, wherein the nickel oxide fibers are coupled to nickel fibers that are in turn coupled to the nickel substrate;
   a second electrode; and
   an electrolyte in contact with both the first electrode and the second electrode.

2. The battery of claim 1, wherein the nickel substrate includes a nickel foam.

3. The battery of claim 1, wherein the first electrode is configured as an anode.

4. The battery of claim 1, wherein the second electrode includes lithium metal.

5. The battery of claim 1, wherein the electrolyte includes $LiPF_6$.

6. A method of forming a battery electrode, comprising:
   attaching a number of first nickel fibers to a nickel substrate;
   etching the number of first nickel fibers to form second nickel oxalate fibers on the first nickel fibers;
   reducing the second nickel oxalate fibers to form second nickel fibers on the first nickel fibers; and
   oxidizing the second nickel fibers to form second nickel oxide fibers coupled to the nickel substrate.

7. The method of claim 6, wherein attaching the number of first nickel fibers to the nickel substrate includes attaching to a nickel foam.

8. The method of claim 6, wherein reducing the second nickel oxalate fibers includes reducing in hydrogen.

9. The method of claim 6, wherein oxidizing the second nickel fibers includes oxidizing in air.

* * * * *